United States Patent
Pickard et al.

(10) Patent No.: US 8,393,480 B2
(45) Date of Patent: Mar. 12, 2013

(54) PROCESSING APPARATUS AND METHOD OF OPERATION THEREOF

(75) Inventors: Douglas M. Pickard, St. Catharines (CA); Richard Baumann, St. Catharines (CA); Tom Pollard, Grimsby (CA); John Hordyk, Beamsville (CA)

(73) Assignee: RMT Robotics Limited, Grimsby (CA)

( * ) Notice: Subject to any disclaimer, the term of this patent is extended or adjusted under 35 U.S.C. 154(b) by 0 days.

(21) Appl. No.: 13/207,614

(22) Filed: Aug. 11, 2011

(65) Prior Publication Data

US 2011/0303473 A1 Dec. 15, 2011

Related U.S. Application Data

(60) Division of application No. 12/116,403, filed on May 7, 2008, now Pat. No. 8,006,849, which is a continuation of application No. PCT/CA2006/001826, filed on Nov. 8, 2006.

(60) Provisional application No. 60/734,274, filed on Nov. 8, 2005.

(51) Int. Cl.
*A47F 7/04* (2006.01)

(52) U.S. Cl. ............. 211/23; 180/167; 206/304

(58) Field of Classification Search .......... 180/167; 211/23–24, 194, 189, 13.1, 19–20; 414/13, 414/222, 467, 470; 206/304, 386; 212/326
See application file for complete search history.

(56) References Cited

U.S. PATENT DOCUMENTS

| | | | | |
|---|---|---|---|---|
| 1,254,186 A * | 1/1918 | Alderfer | | 217/49 |
| 2,028,436 A * | 1/1936 | Cady | | 242/538.1 |
| 3,880,291 A * | 4/1975 | Sylvester | | 211/24 |
| 4,040,521 A * | 8/1977 | Fitzpatrick | | 211/24 |
| 5,840,237 A * | 11/1998 | Ohya | | 264/326 |
| 6,044,968 A * | 4/2000 | Iampen | | 206/304 |
| 6,298,999 B1 * | 10/2001 | Bellman | | 211/24 |
| 2003/0056881 A1 * | 3/2003 | Lemaire et al. | | 156/111 |
| 2006/0289317 A1 * | 12/2006 | Vetuskey et al. | | 206/304 |
| 2008/0308433 A1 * | 12/2008 | Pickard et al. | | 206/304 |

FOREIGN PATENT DOCUMENTS

| | | |
|---|---|---|
| CA | 2028436 | 5/1991 |
| EP | 0 957 040 | 3/2006 |
| JP | 08143081 | 6/1996 |

* cited by examiner

*Primary Examiner* — John Walters
*Assistant Examiner* — James Triggs
(74) *Attorney, Agent, or Firm* — McCarthy Tétrault LLP

(57) ABSTRACT

A manufacturing facility includes a storage facility and a production facility. Workpieces are located in the storage facility in temporary storage accommodations, and are moved between the storage facility and stations in the production facility by mobile carrier units. The temporary storage accommodations may be units having a generally circular lading envelope, and an hexagonal optimal packing density. The mobile carrier units may be automated guided vehicles and may include self-navigating software, and interactive communication with other guided vehicles to permit suitable routes to be chosen, or to permit obstacles to be avoided. The facility may include a workpiece retrieval apparatus used for transferring workpieces between the storage accommodations and the automated guided vehicles, or to other locations. The workpiece retrieval apparatus may be mounted on a bridge, and may include a multi-element raising and lowering array that is biased to oppose torsional deflection of the lifting member.

4 Claims, 20 Drawing Sheets

Section G-G

Section H-H

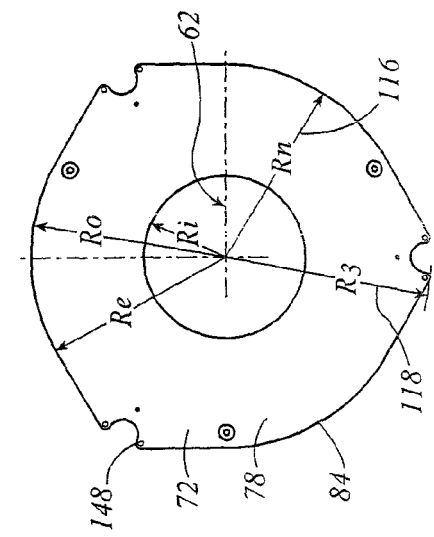
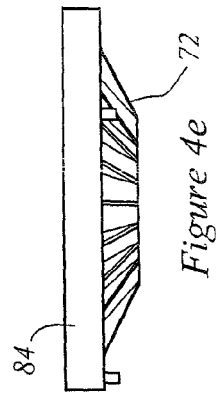
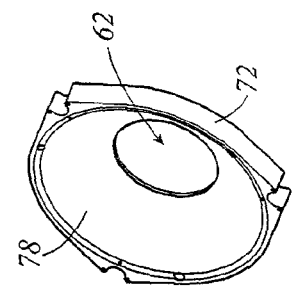
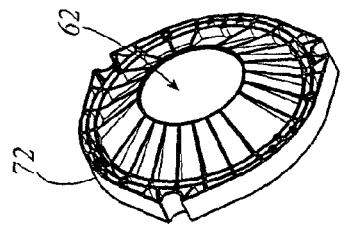
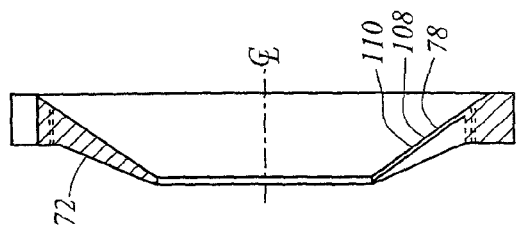
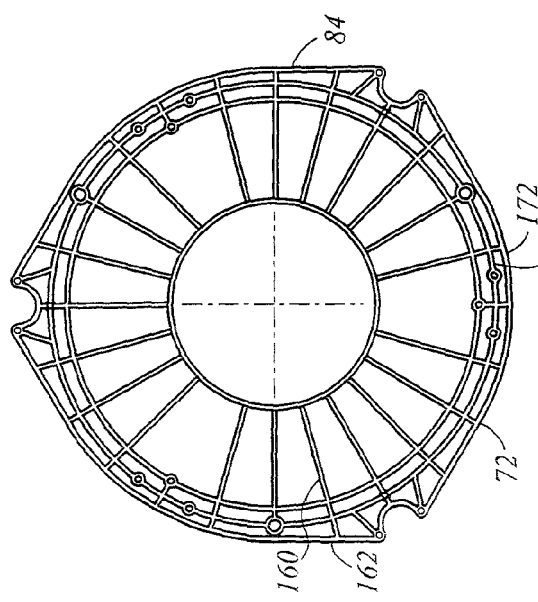
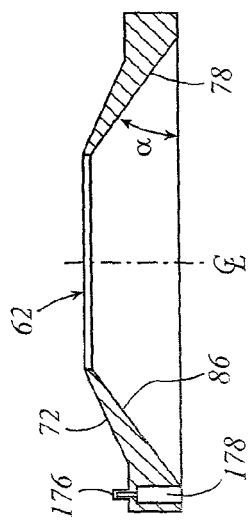

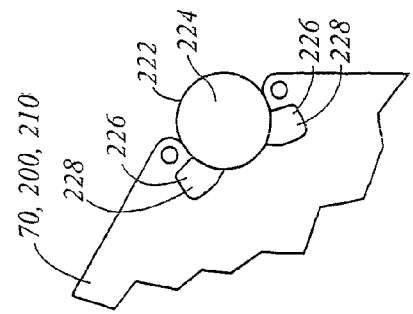
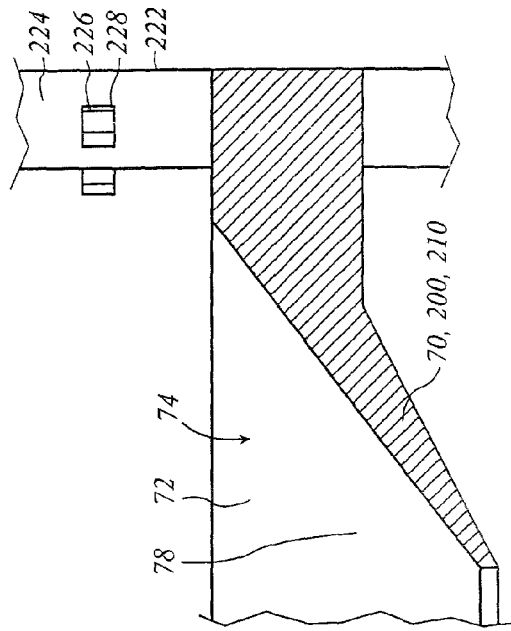
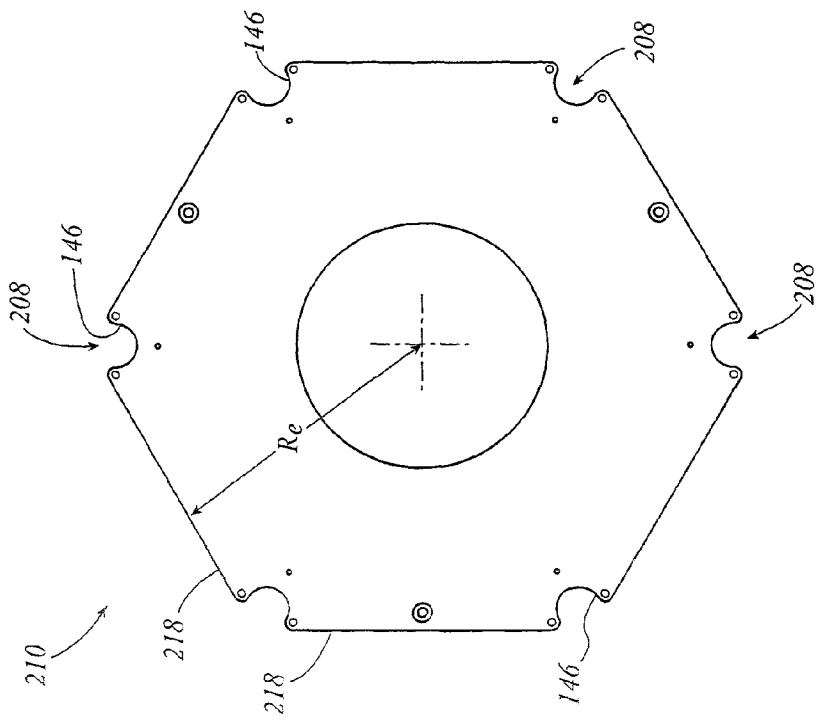

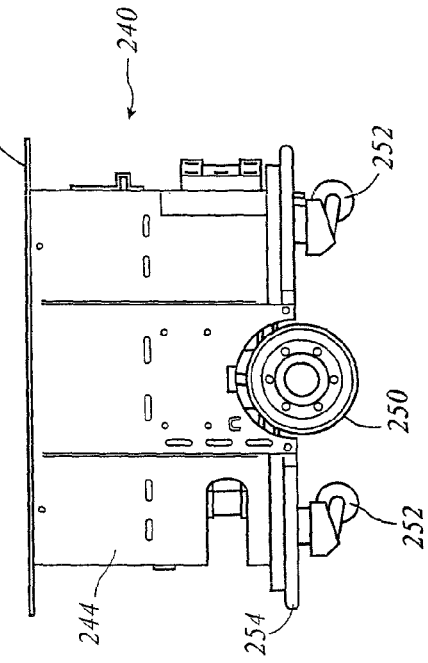
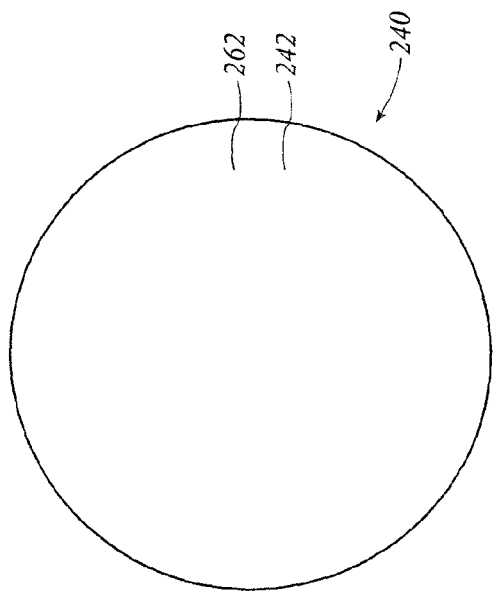
Figure 6b
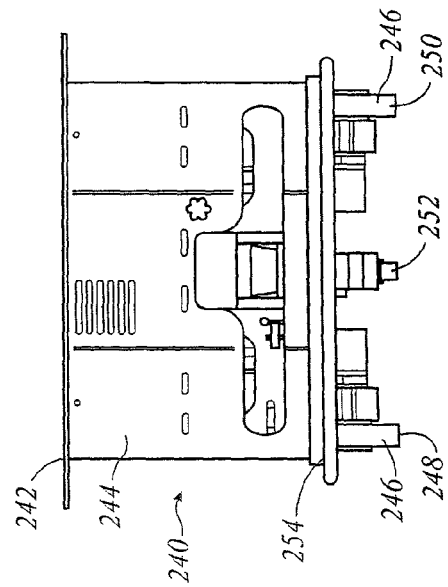
Figure 6c

PROCESSING APPARATUS AND METHOD OF OPERATION THEREOF

This application is a divisional of U.S. patent application Ser. No. 12/116,403, filed May 7, 2008, now U.S. Pat. No. 8,006,849 and incorporated herein by reference, which is a continuation of International Patent Application No. PCT/CA2006/001826, filed Nov. 8, 2006, and incorporated herein by reference, and claims the benefit of U.S. Provisional Patent Application No. 60/734,274, filed Nov. 8, 2005, and incorporated herein by reference.

FIELD OF THE INVENTION

This invention relates to the field of equipment for moving objects during various steps in a production process.

BACKGROUND OF THE INVENTION

Many production processes involve the movement of partially processed subassemblies. It may be that while units have completed one step in a process, it is necessary to store them temporarily before they can be moved to the next step in the production process. Sometimes it is important that individual partially processed units not touch each other while in an intermediate state. It may also be that it may be desirable to be able to track and sort individual units, whether by particular properties, by age, by size, or other criteria. It may also be important to know and control the physical orientation of an object to facilitate a subsequent processing step.

SUMMARY OF THE INVENTION

In one aspect, the present invention provides a carrier, such as may be a carrier, or tote, for uncured rubber products such as tires that has a generally round shape for accommodating a green (i.e., uncured) tire. Legs are mounted about the generally round shape. The legs may be mounted in blisters that merge with the generally round shape. The tote also has portions that do not have blisters, those portions lying at a lesser radius from the center of the tote than the support legs. The tote is stackable, and, when several stacks are placed adjacent to each other may most efficiently be stacked in a generally hexagonal pattern in which some interstitial spaces are occupied by the blisters and legs, and some interstitial spaces are left empty, those empty spaces admitting a lifting device such as may engage the tote and lift it from a stack, or deposit it on a stack.

The tote may have a spanning or bridging member, and posts supporting that bridging member. The spanning member and the post members may be made of different materials. The spanning member may be a molded plastic member and the posts may be metallic members.

In another aspect of the invention there is a tire tote for supporting green tire workpieces. The tire tote has a carrier member having a workpiece support interface. The carrier member has a center, at least one peripheral nadir and at least one peripheral zenith. The peripheral nadir lying a first distance from the center. The peripheral zenith lies a second distance from the center. The first distance is less than the second distance. A ratio of the second distance to the first distance lies in the range of less than two thirds of the square root of three.

In a feature of that aspect of the invention, the tote has upstanding legs mounted thereabout, each of the legs being located closer to one the peripheral zenith than to any the peripheral nadir. In another feature, the tire tote has lifting members mounted thereto, each the lifting lug being located closer to one of the peripheral nadirs that to any one of the peripheral zeniths. In another feature, the tote has upstanding legs mounted thereabout, each of the legs being located closer to one the peripheral zenith than to any peripheral nadir. The tire tote has lifting members mounted thereto. Each the lifting lug is located closer to one of the peripheral nadirs than to any one of the peripheral zeniths.

In another aspect of the invention there is a tire tote for supporting a green tire workpiece. The tire tote includes a sling member having a workpiece support interface upon which to place green tires. The sling member has a workpiece envelope radius. Support legs are mounted to the sling member. The support legs are located outside the workpiece envelope radius. The tire tote has lifting fittings, the lifting fittings being circumferentially offset from the support legs.

In another aspect of the invention there is a mobile unit that is operable to transport green tires. The mobile unit is a robotic guided vehicle, also sometimes called a self-guided vehicle. It has a chassis and drive gear mounted thereto, the drive gear being operable to conduct the mobile unit from place to place. The unit has seat for lading that overhangs the chassis. In a feature of that aspect of the invention, the mobile unit is operable to rotate about its own central vertical axis to permit angular spotting of the workpiece. In a further feature, the seat is movable in at least one horizontal degree of freedom relative to the chassis.

In another aspect of the invention, there is a tire tote for supporting green tire workpiece. The tire tote has a body. The body has a lading envelope. The lading envelope has a circular periphery. The body has a non-circular periphery. The circular periphery of the lading envelope falls within the non-circular periphery of the body. The non-circular periphery has a hexagonal optimal packing density pattern. The tire tote has supports upon which the body may stand. The supports lie outside the circular periphery. The tire tote has lifting fittings by which the body may be lifted from above.

In a feature of that aspect of the invention, the non-circular periphery has corner portions and arcuate portions between adjacent corner portions. The supports are mounted to the corner portions. In another aspect, the lifting fittings are mounted to the arcuate portions. In a further feature, the non-circular periphery is substantially hexagonal. In a still further feature, the non-circular periphery is substantially a regular hexagon. In still another feature, the lifting fittings and one of the supports are located together. In a yet further feature, the tire tote includes a sloped workpiece engagement interface. In still another feature, the tire slope engagement interface is a portion of a conical surface.

In a further aspect of the invention, there is a tire tote for supporting green tire workpieces. The tire tote has a sling member having a workpiece support interface upon which to place green tires. The sling member has a workpiece envelope radius. Support legs are mounted to the sling member. The support legs are located outside the workpiece envelope radius. The tire tote has lifting fittings. The lifting fittings are circumferentially offset from the support legs.

In still a further aspect of the invention, there is a transporting unit operable to carry a green tire within a tire manufacturing facility. The transporting unit has a lading seat supported on a chassis and running gear mounted to the chassis. The running gear is operable to cause the unit to move from place to place. The unit has a control system operable to receive destination signals and to operate the running gear. The lading seat includes a lading interface upon which a green tire may be carried. The lading interface has at least one degree of freedom of motion relative to the chassis.

In an additional feature of that aspect, the lading interface has two degrees of freedom of motion relative to the chassis. In another feature, the two degrees of freedom permit longitudinal and lateral translation of the interface relative to the chassis. In still a further feature, the unit includes a self-centering motion allowance member mounted in a load path between the chassis and the lading interface. In yet another feature, the self-centering motion allowance member includes first and second surfaces in rolling contact, the surfaces being biased toward and at rest position. In still a further aspect of the present invention the self-centering allowance member includes a motion deterrent member, the motion deterrent member including a detent pit formed in one of the surfaces and engageable with the other of the surfaces to deter motion therebetween below a threshold level of dislodging force.

In one aspect, the present invention provides a carrier, such as may be a carrier, or tote, for uncured rubber products such as tires that has a generally round shape for accommodating a green (i.e., uncured) tire. Legs are mounted about the generally round shape. The legs may be mounted in blisters that merge with the generally round shape. The tote also has portions that do not have blisters, those portions lying at a lesser radius from the center of the tote than the support legs. The tote is stackable, and, when several stacks are placed adjacent to each other may most efficiently be stacked in a generally hexagonal pattern in which some interstitial spaces are occupied by the blisters and legs, and some interstitial spaces are left empty, those empty spaces admitting a lifting device such as may engage the tote and lift it from a stack, or deposit it on a stack. In a feature of that aspect, the tote may have a spanning or bridging member, and posts supporting that bridging member. The spanning member and the post members may be made of different materials. The spanning member may be a molded plastic member and the posts may be metallic members.

In another aspect of the invention, there is an overhead retrieval unit. It includes a gantry crane movable along tracks in an x-direction, the gantry crane including a bridge overspanning a space between the tracks, and a lifting apparatus mounted to the bridge, and movable therealong in a y-direction. The lifting apparatus has a head member and a depending member. The depending member is movable in a z-direction relative to the head member. There are linking members movable to raise and lower the head member. The linking members are selected from the set of linking members that (a) are movable from a vertical orientation to an horizontal orientation; and (b) movable from a vertical orientation to a reeled orientation.

In a feature of that aspect, the lining members include a set of cables and the set of cables is biased to work against torsional displacement of the depending member about the z axis. In another feature, the members of the set of cables are arranged to be reeled at the same take up rate. In a further feature the cable set members are reeled by a common drive.

Another aspect of the invention includes the use in a manufacturing facility of a transporting unit to carry an object, the object being one of (a) a workpiece; and (b) a workpiece in a carrier, between stations in that manufacturing facility. The transporting unit has a footprint corresponding substantially in size to that of the object being transported. The transporting unit is capable of determining its own path between stations, and is capable of spotting the object being carried with respect to the stations between which it carries the object.

In a feature of that aspect, the transporting unit has a carrying interface that is in the range of 80 to 120% of the largest object to be transported. In another feature, the transporting unit has an obstruction sensor, and obstruction avoidance software. In a further feature, the transporting unit has communications apparatus providing data updates with respect to the location of at least one of (a) other such transporting units in the manufacturing facility; and (b) obstacles. In another feature the object to be transported includes a green tire.

These and other aspects and features of the invention may be understood with reference to the detailed description and the accompanying illustrations as set forth below.

BRIEF DESCRIPTION OF THE FIGURES

The principles of the invention may better be understood with reference to the accompanying figures provided by way of illustration of an exemplary embodiment, or embodiments, incorporating principles and aspects of the present invention, and in which:

FIG. 1b shows an additional view of the workpiece production facility of FIG. 1a;

FIG. 2a is an isometric view of a carrier assembly for use in the production facility of FIG. 1a;

FIG. 2b is an isometric view, from below, of the carrier assembly of FIG. 2a;

FIG. 2c is a side view of the carrier assembly of FIG. 2a;

FIG. 2d, is a bottom view of the carrier assembly of FIG. 2a;

FIG. 2e is a detail view of an attachment of the carrier assembly of FIG. 2a;

FIG. 2g is an isometric view from above and to one side of an alternate carrier assembly to that of FIG. 2a;

FIG. 3b shows a diametral cross-section of the carrier assembly of FIG. 3a;

FIG. 3c shows a top view of the assembly of FIG. 3a;

FIG. 4a is an isometric view, from above and to one side, of a workpiece accommodation member of the carrier assembly of FIG. 2a;

FIG. 4b is an isometric view, from one side and below, of the member of FIG. 4a;

FIG. 4c shows a top view of the member of FIG. 4a;

FIG. 4d shows a bottom view of the member of FIG. 4a;

FIG. 4e shows a side view of the member of FIG. 4a;

FIG. 4f show a cross-section on section '4f-4f' of FIG. 4d;

FIG. 4g shows a cross-section on section '4g-4g' of FIG. 4d;

FIG. 5b shows a top view of an alternate carrier assembly to that of FIG. 5a;

FIG. 5c shows a top view of an alternate carrier body to that employed in the carrier assembly of FIG. 5a;

FIG. 5d is a detail, from above, of an alternate fitting for the carrier assembly of FIG. 5a;

FIG. 5e is a sectional view on arrow '5e' of FIG. 5d;

FIG. 6a shows a mobile carrier unit for use in the facility of FIG. 1a.

FIG. 6b is a top view of the mobile carrier unit of FIG. 6a;

FIG. 6c is an end view of the mobile carrier unit of FIG. 6a;

FIG. 6d is a side view of the mobile carrier unit of FIG. 6a;

FIG. 6e is an end view of an alternate mobile carrier unit to that of FIG. 6a;

FIG. 6g is an end view of another alternate mobile carrier unit to that of FIG. 6a;

FIG. 6i is an end view of a further alternate mobile carrier unit to that of FIG. 6a;

FIG. 7a is a top view of a mobile carrier unit having an alternate seat configuration to the mobile carrier of FIG. 6a;

FIG. 7b is a side view of the mobile carrier unit of FIG. 7a;

FIG. 7c is an end view of the mobile carrier of FIG. 7a; and

FIG. 7d is a detail view of the mobile carrier unit of FIG. 7a.

FIG. 8c shows a side view of the mobile carrier unit of FIG. 8a;

FIG. 8d shows a top view of the mobile carrier unit of FIG. 8a;

FIG. 8e shows an end view of the mobile carrier unit of FIG. 8a;

DETAILED DESCRIPTION

Figure 1A:
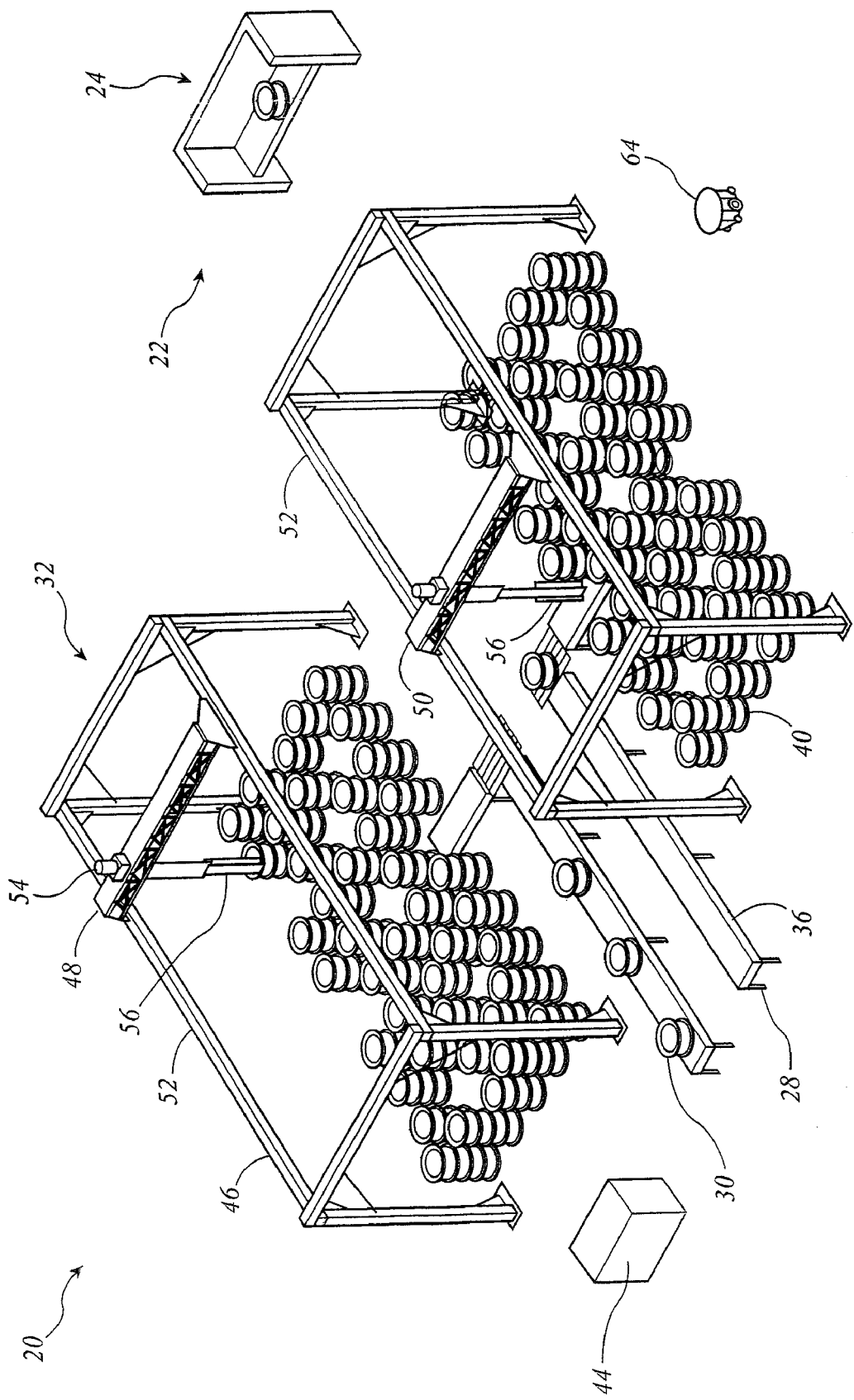
FIG. 1a shows an isometric general arrangement view of a portion of a workpiece production facility.

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances proportions may have been exaggerated in order more clearly to depict certain features of the invention.

An industrial manufacturing process may involve a first processing step, and a subsequent second processing step. There may be a waiting, or temporary storage, or inventory stage or step, between the first and second processing steps. For example, the second processing step may be a batching step, and it may be necessary to accumulate a supply of work-pieces before the second batch operation may take place. Alternatively, the first operation may be a batch process, and the second process may be incremental, such that a batch of work pieces delivered from the first step may be drawn down slowly and incrementally by the second step. In the further alternative, the first and second steps may have different rate determining criteria. That is, either of the steps may involve a manual assembly stage, that may be reasonably quickly completed, while the other may involve a heating, cooling, drying or curing step that may be more time consuming. Further still, one of the steps may involve the use of highly specialised equipment that may be in relatively short supply because of high capital cost or some other reason.

Figure 1B:
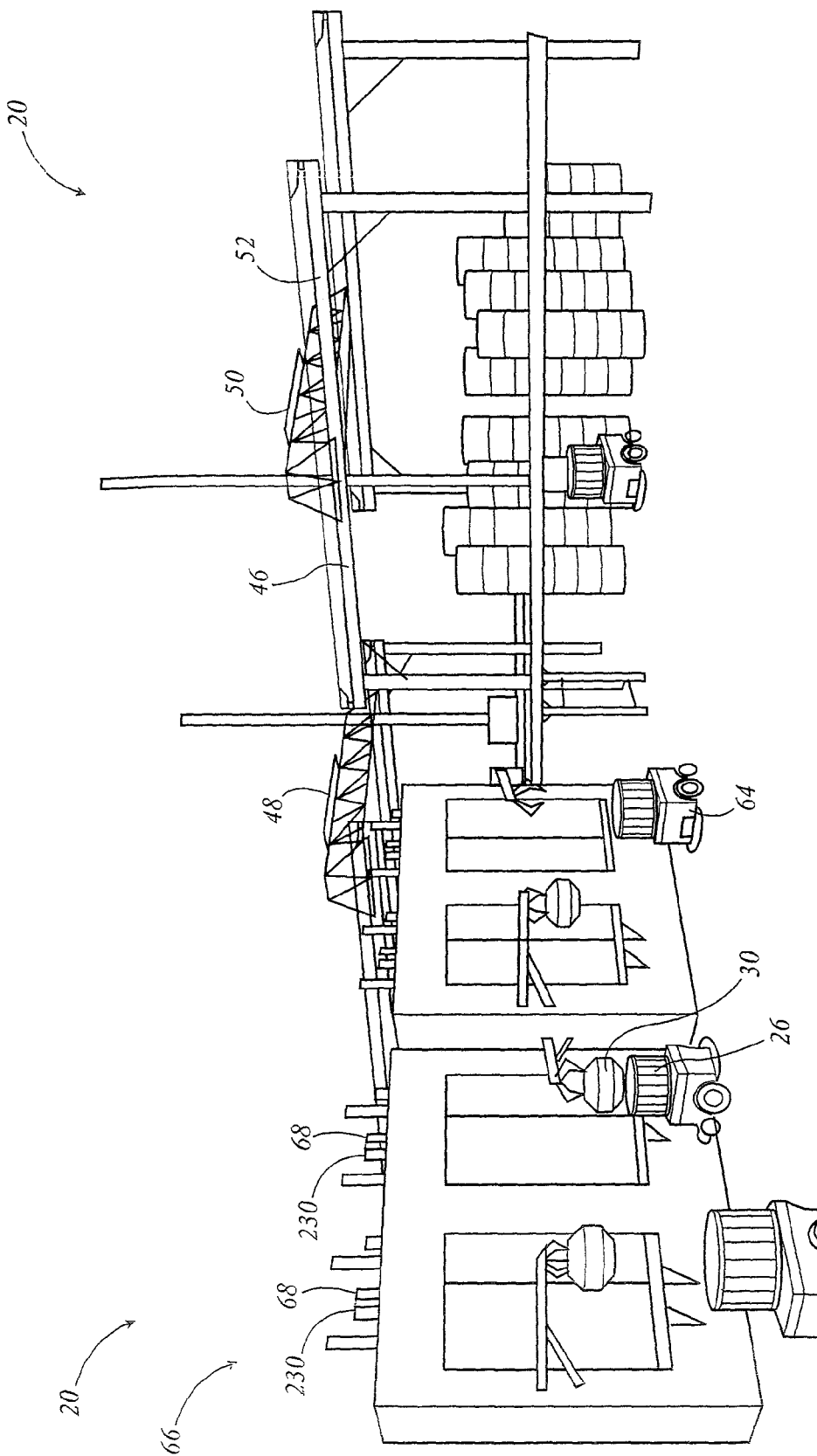

By way of a general overview, an example of such a process may be undertaken in a manufacturing facility such as is generically represented by manufacturing facility 20 of FIGS. 1a and 1b. Facility 20 may be a tire manufacturing facility. Facility 20 may include a first zone 22, in which a first manufacturing step, or series of steps, may occur. In the case of tire manufacturing, that first manufacturing step may involve the lay-up of a tire into a green state. The green state refers to the state of the tire assembly after the various constituents have been assembled for curing, but have not yet been cured. The lay-up process may involve the slow rotation of a tire carcass assembly as it is built up by adding layers of belts, tread, and sidewalls. When this process is finished, the slow turning may cease, and the green tire assembly may be removed from the stand or jig 24 upon which is has been formed. Inasmuch as the green tire may have discontinuities, such as tire splices, where the ends of various circumferentially extending parts meet, such as belts or treads, the green tire may be given an indicator marking by which the location of the discontinuity may be known. The green tire may in a more generic sense be termed the workpiece 26 of this process.

Work piece 26 may then be directed away from the first zone and sent by means of one or more conveying devices, generally indicated as 28 to a second zone for further processing. The conveying devices 28 may first transport workpiece 26, which may be a green tire, 30, to a temporary storage facility 32, which may also be referred to as temporary inventory, a warehouse, a storage shed, or as a buffer, or place in which buffer stock is held, sometimes referred to simply as a buffer.

It may be that at the time of removal of the workpiece from the first process step, the workpiece may be in an intermediate state in which it may be helpful not to allow that workpiece to come into contact with other workpieces. For example, in the case of a green tire, the uncured rubber may be tacky, or sticky, and allowing two such workpieces to contact one another may effectively ruin both of them. It may also be that the number of workpieces in the buffer stock may be such that stacking is either desirable or necessary in the interest of more efficient use of factory floor space. Further, it may be that workpieces may be built to several different specifications in one plant, and to several different sizes. To the extent that the intermediate workpieces may be sensitive to an aging effect while in the green state, they may have, in effect, a "best before" date, (i.e., a date after which the compound to be cured may have aged or degraded such that the workpiece must be scrapped. An operator may wish to keep track of how long each unit has been in the buffer stock so that appropriate scheduling may take place in terms of avoiding having to scrap workpieces that have been in the buffer stock too long.

In that regard, conveying devices 28 may include a first apparatus 34 operable to remove the intermediate workpiece from a workstand or jig 22 and to place it on a first conveying device 36. First conveying device 36 may carry workpiece 26 to another loader. That loader may be operable to remove workpiece 26 from conveying device 36, and to mate it with a storage apparatus 40. The loader may be operable to mate workpiece 26 with apparatus 40 in a particular known orientation with respect to the placement of the orientation indicator marking. Storage apparatus 40 may then be used to accommodate workpiece 26 during a time period when workpiece 26 is in a green state in temporary storage facility 32.

Storage apparatus 40 may be operable to permit stacking of several apparatus 40, (and hence several workpieces 26), one atop the other. Storage apparatus 40 may also be operable to maintain a workpiece 26 in isolation from other similar workpieces 26 during movement and during temporary storage. The portions of apparatus 40 that may engage workpiece 26 may tend to be of a non-interacting, or interaction-resistant nature. For example, where workpiece 26 is of a sticky or tacky nature, apparatus 40 may be non-reactive, or non-participating with that sticky substance such as to discourage or prevent adhesion.

A control system 44 may be used to determine where workpiece 26 is to be stacked in temporary storage facility 32. It may be that temporary storage facility 32 may also function as a sorting or scheduling facility. That control system 44 may include a central processing device having a storage location database, and having software operable to track, to generate instructions to store and to retrieve workpieces in the facility, and to move workpieces from one place to another. Control system 44 may communicate, such as by ethernet signals or other electronic network means, with other loading, processing, and transporting equipment in facility 20. It may be that the database may include further data identifying the size, composition, age or other pertinent data for each workpiece 26 in addition to storage location. Control system 44 may be connected to drive a storage and retrieval assembly, such as may include a three-space locator assembly 46. Three-space locator assembly 46 may include a gantry crane, or cranes, 48, 50, each operable to move along a trackway 52 in a first degree of freedom, such as linear translation along a trackway in a direction arbitrarily identified as an x-direction. The trackway may be in the form of rails or paths of an overhead post and girder structure, as illustrated. Each gantry crane 48, 50 may have a cross-head 54 that is operable in another degree of freedom, such as a linear degree of freedom other than that of the longitudinal direction, be it a lateral, or predominantly lateral, or y-axis direction. Cross-head 54 may have a picking member 56 mounted thereto, the picking member being operable in a third degree of freedom, such as in vertical translation along a z-axis. It may also have a fourth degree of freedom, such as rotation of picking member 56 about the vertical axis. While a Cartesian coordinate system is described by way of example, such a system could employ a cylindrical polar co-ordinate system, or a spherical co-ordinate system, or such other as may be suitable. A Cartesian system may be more readily visualised for conceptual explanation.

When a workpiece 26 in an intermediate stage in processing arrives at temporary storage facility 32, workpiece 26 may be mated with a storage apparatus 40. Input crane 48 may then be used to locate workpiece 26 and apparatus 40 in a unique, known position in temporary storage facility 32. Crane 48 (or 50) may be used in a preliminary manner to unstack workpieces previously stored, or to place them in other stacks, and to restack them in different locations to accommodate a newly added workpiece 26, and then to re-stack other workpieces there atop, or not, to facilitate sorting or scheduling.

At some later time, either crane 48 may again be used to retrieve apparatus 40 and hence workpiece 26 from its known location, or crane 50 may be used for this purpose as a designated output crane, where, for example, the cranes share a trackway, or are mounted on overlapping trackways, one above the other. In the further alternative, both crane 48 and 50 may be used for both input and output, with scheduling and co-ordination of their tasks being governed by a controlling and scheduling device such as a central processor of control system 44. While two such cranes are illustrated, a single crane could be used. Similarly, more than two cranes could be employed.

Once retrieved from the known temporary storage location (which, given the possibility of stacking and restacking, may not have been the original location in which workpiece 26 was placed), workpiece 26 may be disengaged from apparatus 40 by either the original loader, or another unloading device for further processing. In one example, workpiece 26 may be disengaged from storage apparatus 40 and engaged to a further transport apparatus 64, which may be used to deliver workpiece 26 to a second processing zone, 66 (FIG. 1*b*). At this location workpiece 26 may be disengaged from transport apparatus 64 and engaged with second processing apparatus 68 in which a further processing step may occur. For example, in the case of tire manufacturing, second processing apparatus 68 may be a tire press 230 in which a green tire 30 is cured for a certain time period, be it 10 to 15 minutes, for example, at which time workpiece 26 may be released as a fully cured tire, and sent away by a suitable transport means, be it apparatus 64 or some other, for such other or further processing as may be required.

Figure 2A:
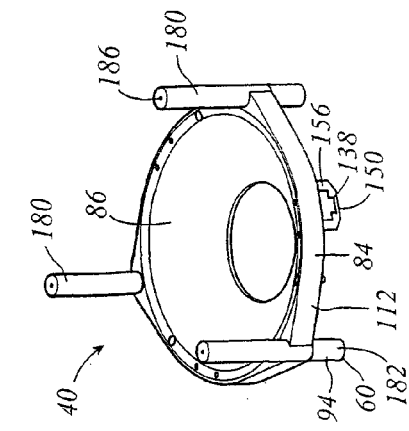
Figure 2B:
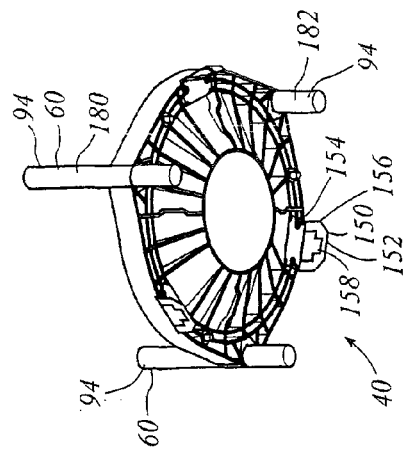
Figure 2E:
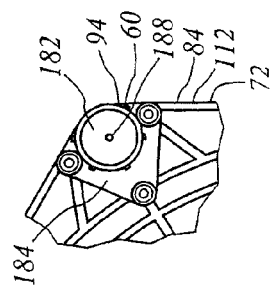
Figure 2F:
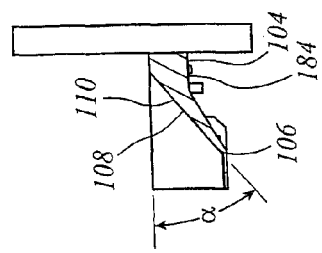
FIG. 2f is a sectional detail on '2f-2f' of FIG. 2d.
Figure 2C:
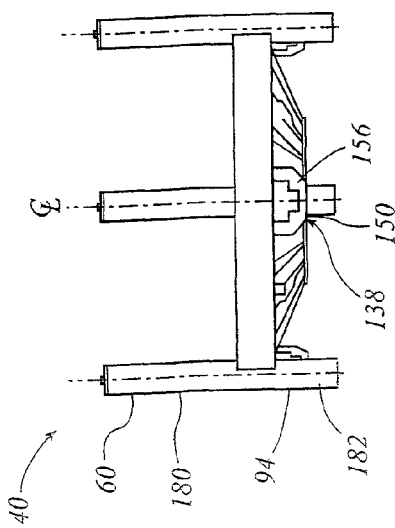

An embodiment of temporary storage apparatus 40, is illustrated in FIGS. 2*a*-2*f*. In one example, temporary storage apparatus 40 may be as shown in FIG. 1*b*, or may be as shown in FIG. 2*a*. In the embodiment of FIG. 2*a*, apparatus 40 is identified as a carrier 70 for automobile or truck tires in the green state. Such carriers are sometimes referred to in the industry as a "tote" or "totes". In the context of this device, a cylindrical polar co-ordinate system may be imagined, in which the vertical, or z-axis is the axial direction about which a body of revolution may be formed, the radial direction, or r-axis is measured linearly away from the z-axis in a plane to which the z-axis is normal, and the circumferential direction is measured as an angular position in that plane relative to a datum.

Carrier 70 may include a first member 72, which may be a formed sheet or plate, that defines a base, a bed, a seat, or an accommodation 74 upon which, or in which, a green tire 30 may be engaged. That engagement may include the placement of a portion, or portions, of the sidewall 76 of the green tire 30 against first member 72, by which the weight of green tire 30 may be supported in a distributed manner. First member 72 may include a generally centrally located relief 80, which may include a central aperture, port or opening 82.

It may be that first member 72 is a generally radially or horizontally extensive support member that may be of sufficient extent to carry a range of sizes of workpiece 26. Carrier 70 may also include an axially, or predominantly vertically extending support, or array of supports, identified generally as 60, to which first member 72 is mounted, and through which the vertical loads of first member 72 are reacted.

Support member 72 may have the form of an inverted cone 86 having a side slope angle indicated by angle alpha, α. The centerline, or axis of revolution about which this surface is formed is identified as axial centerline CL. Angle alpha may be in the range of about 30 to 55 degrees, or more commonly in the range of 30 to 40 degrees, and in one embodiment may be about 36 degrees (+/−2). That cone may be truncated in a central region, leaving an opening 62 thereat. When used to carry a green tire, opening 62 may tend to underlie the central opening in a green tire 30. Support member 72 may have a peripheral wall 84 extending thereabout, cone 86 being connected thereto. Peripheral wall 84 may vary in radial distance from centerline CL, some portions being at a lesser radius, and some portion, or portions being at a greater radius. Expressed differently, peripheral wall 84 (and the overall periphery defined by the projected outline of carrier 70 more generally), although it may be generally circular in some portions, may be non-circular overall. Inverted cone 86 may thus present a frusto-conical section. The inward, and upwardly facing frusto-conical surface of inverted cone 86 may present a lading support interface 78. Other embodiments of lading support interface are possible. For example, alternatively, first member 72 may include or have, or be, an array of feet, or pads, or ribs, which may be spaced circumferentially about an axial centerline on angular pitches (whether regular or irregular) such as may be sufficient to support the weight of green tire 30, in such a manner as may tend to discourage the formation of impressions or blemishes in the green material. That is to say, support member 72 need not present a continuous circumferential surface. It may be that slope alpha may be such as generally to encourage a generally tangential engagement with green tire 30 at a location generally close to the radially more distant portion 90 of sidewall 74, near tread portion 98, as opposed to close to the inner radius bead of the tire, 88. The upper surface of this part may have a substantially annular contact array region 108. The contact array region may include a non-smooth, or roughened surface 110, that may have a shark's skin texture, or may have a pebble or a surface pattern of embossed elements, ribs, ridges or blisters in which a large number of small elements may co-operate in providing a supporting surface for the green tire 30.

However lading support interface 86 may be, an inner radius $R_i$ having an origin at the centerline axis CL may be defined as the radius of the circle of largest inscribed radius lying between the Centerline and lading support interface 86. Similarly, an outer radius $R_o$ may be defined as the radius of the smallest circle centered on CL that circumscribes lading support interface 86. $R_i$ may be in the range of 10 to 20 inches, and may perhaps be about 12-18 inches. In one embodiment $R_i$ is about 15 inches. $R_o$ may be in the range of 30 to 45 inches, and in one embodiment may be about 36 inches, (+/−3). The ratio of $R_o$ to $R_i$ may lie in the range of about 2:1 to 3:1, and may in one embodiment be about 2.4:1 (+/−20%). In the case of truck, bus or tractor tires, this ratio may lie in the range of as low as 1.5:1, and up to about 3:1.

First member 72 has an outer peripheral wall 84, (as opposed to the inner periphery about opening 82) and may be mounted upon supports 60 located about that peripheral wall. Carrier 70 may have a lading envelope. That lading envelope may be defined circumferentially by the largest circle that can be inscribed within peripheral wall 84, such that objects outside the radius $R_e$ of that circle are prevented, or discouraged, by the structure of carrier 70 from contacting the lading carried thereon, such as green tire 30. The lading envelope may also have an axial extent, that axial extent being defined by the vertical dimension of supports 60.

A number of other geometric terms may be defined. A first radius 116 may be defined as the shortest radial distance to the nearest external surface of the periphery defined by peripheral wall 84, which may be termed a nadir radius, $R_a$. First radius 116 may tend to correspond generally (+/−) to the lading envelope radius $R_e$, and may correspond, generally (with a tolerance gap) to the largest diameter green tire for which carrier 70 is designed. Where cone 86 extends fully to peripheral wall 84, $R_a$ may also be the same, or substantially the same, as $R_o$. There may also be defined a second radius 118, which may be termed a zenith radius $R_z$, that zenith radius 118 defining a circle to which the outermost extremity of carrier 70 would be tangent, or if not tangent, then inscribed, the radius having an origin coincident with the central vertical axis CL of carrier 70 more generally, and being the axis upon which a green tire 30 loaded into carrier 70 may be centered. The shorter radius, the nadir radius $R_a$, defines a first distance from the center of carrier 70, and the second, or zenith radius $R_z$, defines a second distance, the second distance being larger than the first distance, but less than or equal to $\frac{2}{3}[3]^{1/2}$ (i.e., two thirds of the square root of three) of the shorter distance, or roughly in the range of 100 to 115% of that shorter length. It is also possible to define a hexagon 120, which may be a regular hexagon, that is the smallest hexagon that circumscribes carrier 70 (when viewed from above). Carrier 70 may be such that portions of first member 72 at which supports 60 are mounted lie tangent to, or touch, hexagon 120, and other regions at which it carrier 70 may have lifting lugs or lifting fittings, as described below, may stand shy of hexagon 120, leaving an access space for the introduction of lifting tooling at a plurality of unoccupied corner region portions 114 of hexagon 120.

There may be a further hexagon 122, defined by hexagon 120 plus half of the gap spacing δ between stacks of carriers 70 in use. In one embodiment, gap δ may be about 2" (+/−½") There may also be a triangle 124 defined at the largest gap between three adjacent stacks, each side of triangle 124 having a side defined by a chord drawn perpendicular to a radian drawn through the point of carrier 70 that extends furthest toward the largest gap. A triangle 126 may be defined in the same manner at the location of the smallest gap. Triangle 124 is larger than triangle 126.

A support footprint may be defined by the curve, or polyline 128, that surrounds the members of the array of supports 60 (e.g., as if a large elastic band had been placed around the outside of the array of supports 60, and the resulting footprint projected vertically onto a flat plane). The centroid of carrier 70 is identified as 130. The center of vertical load of carrier 70 is assumed to pass through centroid 130 in both laded and unladed conditions, provided that the lading e.g., green tire 30, is located centrally about the centerline CL. Centroid 130 may be coincident with centerline axis CL. Where there is a nadir radius, there may be a region lying between peripheral wall 84 and hexagon 120. This may be defined as an access allowance region 132. Unoccupied corner region portions 114 are examples of access allowance regions 132. There may be more than one such access allowance region 132, such that a closed polyline enclosing the vertical projection of all such regions is indicated as 134 in FIG. 5a. Centroid 130 of carrier 70 falls within the area enclosed by polyline 134. Lifting features, or lifting lugs of carrier 70, identified generically as 138 may be accessible from above by elements of picking member 56 such as may be introduced by way of regions 132. There may be a plurality of such lifting features, 138. A polyline 140 may be constructed about the center of lift of the locations of these lifting lug features. The region enclosed by polyline 140 may be smaller than, and wholly enclosed within, the region enclosed within polyline 134. Centroid 130 may lie within the region enclosed by polyline 140. When carrier 70 is standing in its own feet, whether laden or unladed, centroid 130 lies within the region defined by polyline 128, this being an indication of static stability. When carrier 70 is being lifted, centroid 130 lies within the region defined by polyline 140 (and hence also 134), again yielding a statically stable condition in which carrier 70 may tend not to tip over.

Figure 5B:
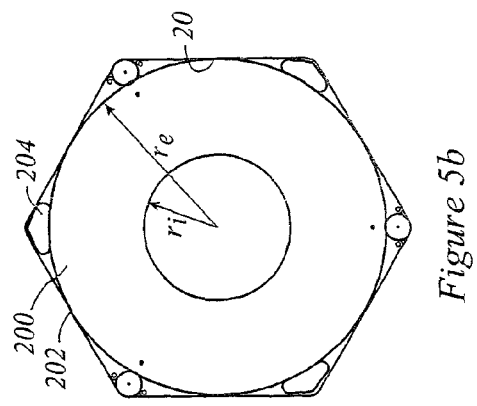
Figure 5A:
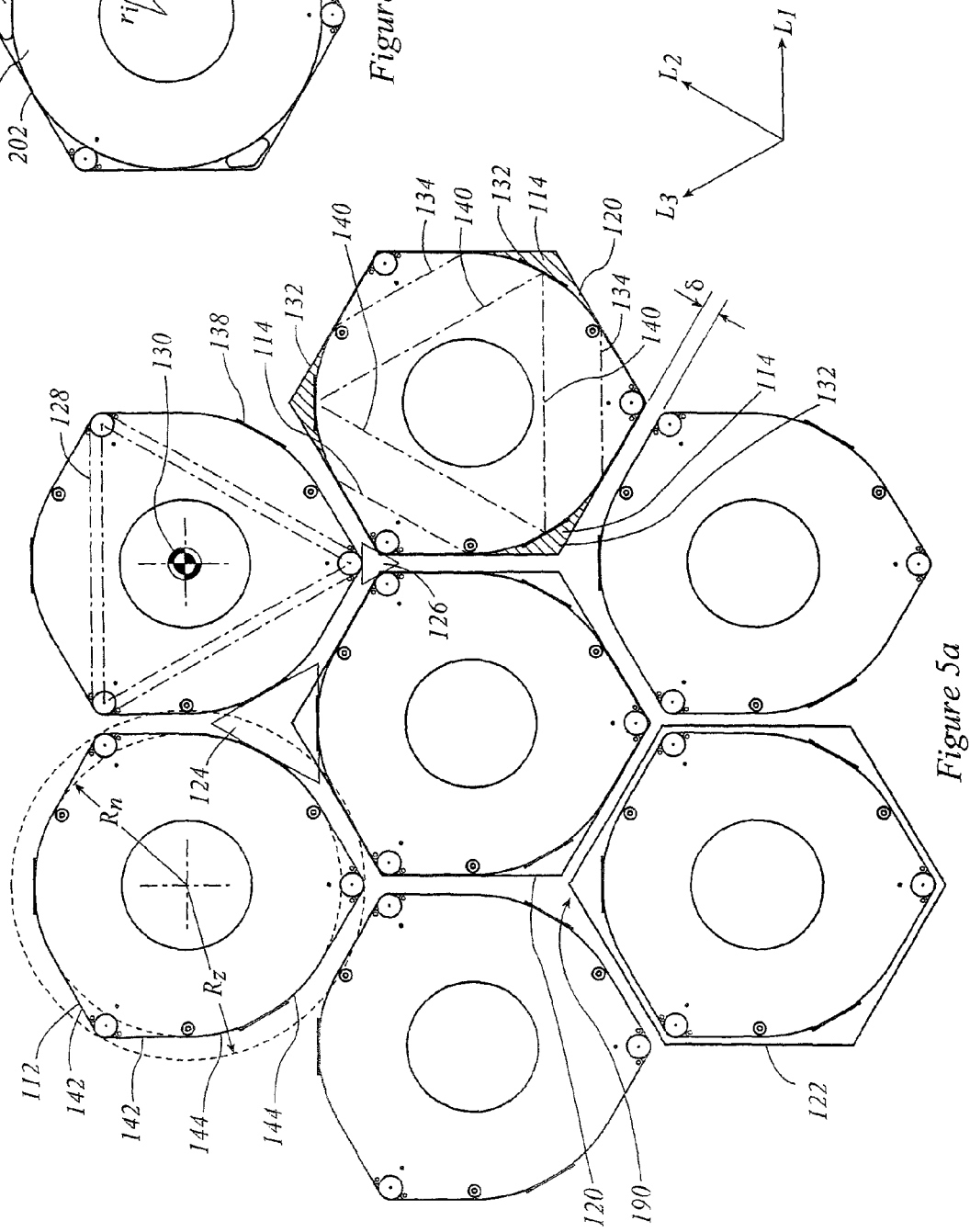
FIG. 5a shows a view, from above, of several of the carrier assemblies of FIG. 2a in a nested configuration.

It may be that the shape of the projected profile of carrier 70 is such that the tightest packing of stacks of carriers 70 may present a hexagonal pattern, an example thereof being shown in FIG. 5a. That is, when most tightly, or densely packed, (i.e., in the manner by which the greatest number of stacks may be made per unit of floor space) a carrier 70 may be surrounded by six other similar stacks. As most tightly packed, the array of stacks may line up in rows, there being three row directions, $L_1$, $L_2$, and $L_3$. Those three row directions may be 120 degrees apart (as opposed to a rectangular or square packing of stacks in which there are two row directions, those row directions being at right angles to each other). The hexagonal pattern may be such that radians running from the center of carrier 70 to the corresponding center of each of the next closest carriers may be spaced about CL on 60 degree spacing.

First member 72 is, in effect, a bridge, or sling, whose workpiece contacting elements are radially inwardly extending portions of this bridge, or beam. In this analogy, where a bridge may be supported at the ends of a span, first member 72 is supported about its periphery, such that vertical loads from the workpiece are carried into first member 72 at an interface or interface array, such as may be generically represented by interface 78 lying radially inwardly of the periphery defined by peripheral wall 84, and then carried by the radially outwardly extending portions of first member 72 to that periphery. The vertical loads carried to the periphery are then passed into the array of supports 60. It may be that first member 72 has a thickness that varies in the radial direction, from a thick, or deep webbed peripheral section, as shown at 104, to a thinner internal section as shown as 106. This variation may be along a linear taper. It may be that carrier 70 is made of metal, such as a mild steel pressing, or, alternatively, may be a molded plastic part.

Peripheral wall 84 of first member 72 may have a generally circular shape, and may have intermittent blisters or fittings 112 that extend radially outwardly of, or proud of what would be an otherwise fully circular profile. Fittings 112 extend radially proud of first radius 116. Fittings 112 may have flanks 142 that merge tangentially into the circular arc portions 144 of peripheral wall 84. The number of fittings 112 corresponds to the number of members of the support array, those members being distributed about peripheral wall 84 in a manner yielding a statically stable structure. In one embodiment, the number of fittings 112 is three, and those fittings may be arranged on 120 degree centers relative to the axial centerline CL, such that the supports mounted thereto form an equilateral triangle. Fitting 112 may include a re-entrant accommodation, or cusp, or bight, or socket 148, at the location of what would otherwise be the vertex formed at the intersection of the planes of flanks 142. A cylindrical member such as a leg or post, may be introduced into socket 148 either radially, and fastened in place, or axially. When supports 60 are mounted to first member 72, as at sockets 148, carrier 70 may be said to have an overall periphery that includes the projected profile of both peripheral wall 84 and the support fittings, such as supports 60 mounted thereto, that peripheral profile defining the required envelope of spaced that carrier 70 may require for stacking, as when stored next to an adjacent stack or stacks.

As examples of lifting features 138, carrier 70 may also have an array of fittings 150, whether identified as crane engagement fittings, lifting lugs, handles, or brackets. This array of fittings may be spaced about peripheral wall 84 again in a manner such that a lifting device engaging those fittings may lift in a manner in which carrier 70 remains stable, with or without a workpiece supported thereon. Fittings 150 may be formed angles 152 having a first leg or flange 154 attached to the underside of first member 72, and a second leg or flange 156 depending therefrom which may be engaged by the lifting device, such as may be. Depending leg 154 may be provided with a profile 158, which may be in the form of an aperture, if a shape for engagement by a mating lifting member of a lifting device, be it a crane, a forklift, or other apparatus. In one embodiment there may be three such fittings 150. They may be spaced on 120 degree centers relative to axial centerline CL. They may be mounted about peripheral wall 84 at locations lying on circular arcuate portions of peripheral wall 84. They may be mounted at the radius of peripheral wall 84 at those locations.

First member 72 may include an array of downwardly depending stiffening webs 160. Webs 160 may tend to run in a generally radial direction from the inner peripheral wall or margin at the central opening, to an outer peripheral wall 162 defining at peripheral wall 84. The array of stiffening webs 140 may include a sub-array 164 of deviated webs 166, 168, having intermediate deviations. Deviated webs 166, 168 may be located in diametrically opposed pairs, and may include four such deviated webs, two of which may be deviated in one circumferential direction (e.g., clockwise) and two in another direction (e.g., counter-clockwise). First member 72 may also have one or more circumferentially extending depending ribs 172, 174 such as may tend to stiffen the periphery of carrier 70. First member 72 may also have male and female indexing members 176, 178 such as may permit a stack of first members 72 to interlock when supports 60 have been removed. This may facilitate shipping and storage of first member 72 when not in use.

Carrier 70 may be free of an overspanning roof or lid. In one embodiment, as described, the overall peripheral profile of carrier 70 may include six portions, three portions being formed on circular arcs, and three having the general form of the corners of a regular hexagon, (i.e., a hexagon of 6 equal sides), the hexagon corners portions alternating with the circular arc portions, and merging tangentially into one another. The alternating portions are provided, in the case of the hexagon corners with vertical supports mounted to bear from below the weigh of carrier 70 and any lading placed thereon as when carrier 70 is stacked, and the circular arc portions are provided with lifting fittings that permit carrier 70 to be lifted from above without impinging on the lading envelope.

First member 72 may be carried by an array of supports, 60, as noted above. That array may include predominantly upwardly extending uprights, posts or standoffs, identified as legs 94. Legs 94 may, for example, have an axial extent that may tend to be at least as great as the maximum axial extent of any green tire to be processed by facility 20 more generally, or a range to accommodate several different sizes of green tires, such that carrier 70 may be used to accommodate a range of different tire products. Legs 94 may be of such number and spacing or circumferential extent, or both, as to permit carrier 70 to stand in a stable manner. In one embodiment, there may be three or more such legs 94. In one embodiment, the largest clear angular spacing between any two supports 94 may be 150 degrees or less. In another embodiment, the largest angular pitch spacing between centers of any two adjacent supports may be 150 degrees. In another embodiment, average pitch spacing may be 120 degrees between centers. In another embodiment, legs 94 may be located on regular 120 degree pitch centers.

It may be convenient for support array 60 to include three predominantly upright legs 94 spaced circumferentially about member 72 on 120 degree centers. However, other alternatives may be used to provide a statically determinate condition. That is, support array 60 may include a wall that is intermittent, having relieves or crenellations. Alternatively, support array 60 may include two members, those members being two opposed feet, in which each of the feet has a substantial circumferential extent, in which the unsupported circumferential angle between the feet is less than about 150 degrees, and perhaps less than 120 degrees. Alternatively, support array 60 may include three or more feet in which the largest unsupported arc is less than 150 degrees between the centers of the farthest spaced adjacent feet, whether the feet are on equidistant centers or not. Alternatively array 60 may include a set of legs spaced on equal centers about the axial centerline CL of carrier 70.

Legs 94 may have a first portion 180 that, when standing upright in normal use, extends upwardly of member 72, and a second portion, 182 that extends downwardly thereof, the sum total of these lengths being as great as, or greater than, the greatest axial dimension of a workpiece to be accommodated by carrier 70. It may be that portion 182 is shorter than portion 180. The extent of portion 182 may be such that it stands downwardly proud of the lower extremity of first portion 72, such that, in use, anything carried by first member 72 will be supported clear of an underlying floor surface (where carrier 70 rests on a floor surface). Legs 94 may each have a cleat, bracket, or attachment fitting 184 such as may mate with first member 72, with leg 94 being engaged in socket 148 of fitting 112. Fitting 184 may be welded or otherwise secured to the major upwardly and downwardly extending portions 180 and 182 of leg 94. Attachment fitting 184 may be secured in place with mechanical fasteners, bonding, or other means as may be appropriate, a triangular fastener pattern being shown, fitting 124 being attached on the underside of first member 72, such that the joining face may tend to be in compression under vertical loads. As noted elsewhere, while it may be that first member 72 is made of a polymeric or composite material, supports 60 may be made of a different material. For example, legs 94 may be made of a polymeric material, or a composite material with a reinforcement matrix, or may be made of such materials as aluminum or steel. Legs 96 may have the form of hollow tubes, and may have indexing members 186, 188, in the nature of male (186) and female (188) mating members at their upper and lower ends. It may be that when several loaded carriers 70 are stacked atop one another, a metal post may be suitable.

FIG. 5a shows several carriers 70, such as may be in stacks next to each other. That is, FIG. 5a could be a view from above of a plurality of stacks in the buffer stock at temporary storage facility 32. The stacked carriers 70 are supported vertically by their supports 60, which seat upon corresponding supports 60 of the carriers therebelow, as may be. However, the periphery of carrier 70, is such that when stacked, there are interstitial openings, or broadened accommodation regions 190 between the stacks. These openings permit the engagement members of a lifting device, such as crane grapples of picking member 56, to be introduced about a stacked carrier 70, to engage lifting fittings 150, and thereby to permit carrier 70 to be raised and lowered as may be desired in loading, stacking, unstacking, re-stacking and unloading operations.

There would be additional interstitial openings or accommodations elsewhere, but those other accommodations are filled with members 96 and fittings 112. That is to say, were carrier 70 fully circular in projected plan view (i.e., when seen from above or below) there would be six interstitial openings or widenings or accommodation regions 190. However, fittings 112 and supports 60 may occupy some of those interstitial accommodations such that vertical support from below is provided in the regions that would otherwise be interstitial accommodations. The other interstitial accommodations, not being filled by fittings 112 and supports 60, permit the introduction, from above, of a second carrier support means, (i.e., second as opposed to the first carrier support means defined by supports 60) by which first member 72 can be supported from below and lifted. The use of a substantially circular base form may then to permit not only lifting and supporting as described, but may also tend to permit tighter stacking of a greater number of workpieces in a given factory space than may previously have been the case with totes of a more nearly square configuration.

In the alternate embodiment of FIG. 5b, a carrier 200 may be substantially the same as carrier 70, except that carrier 200 has a periphery 202 and lifting accommodations 204 formed inside periphery 202, yet outside the lading envelope, symbolised by the circumferential boundary 206 at radius $R_e$. Lifting fittings may be mounted to carrier 200 at the locations of accommodations 204. Those fittings may be substantially the same as, and may be mounted in substantially the same manner as, fittings 112. Alternatively, the periphery of accommodation 204 may be reinforced, whether by being fabricated from steel bar, or other means. Accommodation 204 may have the form of a generally triangular aperture, or may be substantially circular, and may be such as to admit passage therethrough of a lifting tool of picking member 56, which may then engage the underside of carrier 200 (which may have a reinforcing cleat, such as fitting 184. Periphery 202 may be substantially hexagonal, and may achieve its maximum stacking density when stacks are located in hexagonal arrangement. That is, as with carrier 70, the non-circular periphery 202 has an hexagonal optimal packing density pattern.

In the embodiment of FIG. 5c, carrier 210 is substantially the same as carrier 200, but rather than lifting accommodations 204, has lifting accommodations 208 that, rather than being formed in the manner of apertures, have the form of lifting lug fittings 212 that are formed within a generally hexagonal envelope 214, yet outside lading envelope 120 defined by radius $R_e$. Lifting lug fittings 212 may be engaged by picking member 56, thus permitting the lifting of carrier 200 from above. Lug fittings 212 may be brackets having a radially inwardly extending leg or flange, that flange having fittings permitting it to be mounted to the underside of the main portion of the body of carrier 210, in the same, or substantially the same, way that fittings 112 are mounted to carrier 70. Carrier 210, like carrier 200, may have a generally hexagonal, or six cornered, appearance when viewed from above, with the six corners, or vertices of the hexagonal shape extending proud of lading envelope 216. It may be that the flank portions 218 of the body of carrier 210 are formed in the same manner as flanks 142 of carrier 70, and may have a re-entrant accommodation, or socket 146 in the same manner as the corner fittings of carrier 70. Some of these corner sockets may receive legs 94, while others may remain empty so that the support from underneath is provided, as is lifting access.

In a further alternate embodiment, illustrated in FIG. 5d, any of carriers 70, 200, or 210 may be provided with corner post members 222 generally similar to legs 94. Corner post member 222 may have an upper portion 224 generally similar to upper portion 180 of member 94, except that upper portion 180 may include an axial force transmission fitting 226 for engagement by picking member 56, by which carrier 70, 200, 210, or such other as may be so equipped may be lifted from above. Axial force transmission member 226 may be a transverse slot or bore formed in or through upper portion 224, or may have the form of a shoulder, stub, tang, tab, lug, trunnion, or other like member 228 protruding laterally, or radially from upper portion 224 and presenting an object that can be engaged, grasped, or gripped, as may be, by picking member 56. Member 228 may have a downwardly facing shoulder, or abutment, for engagement by picking member 56.

Figure 2D:
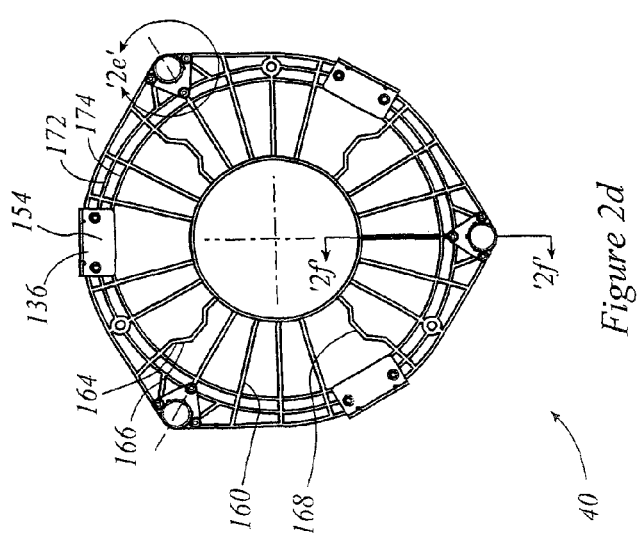
Figure 2G:
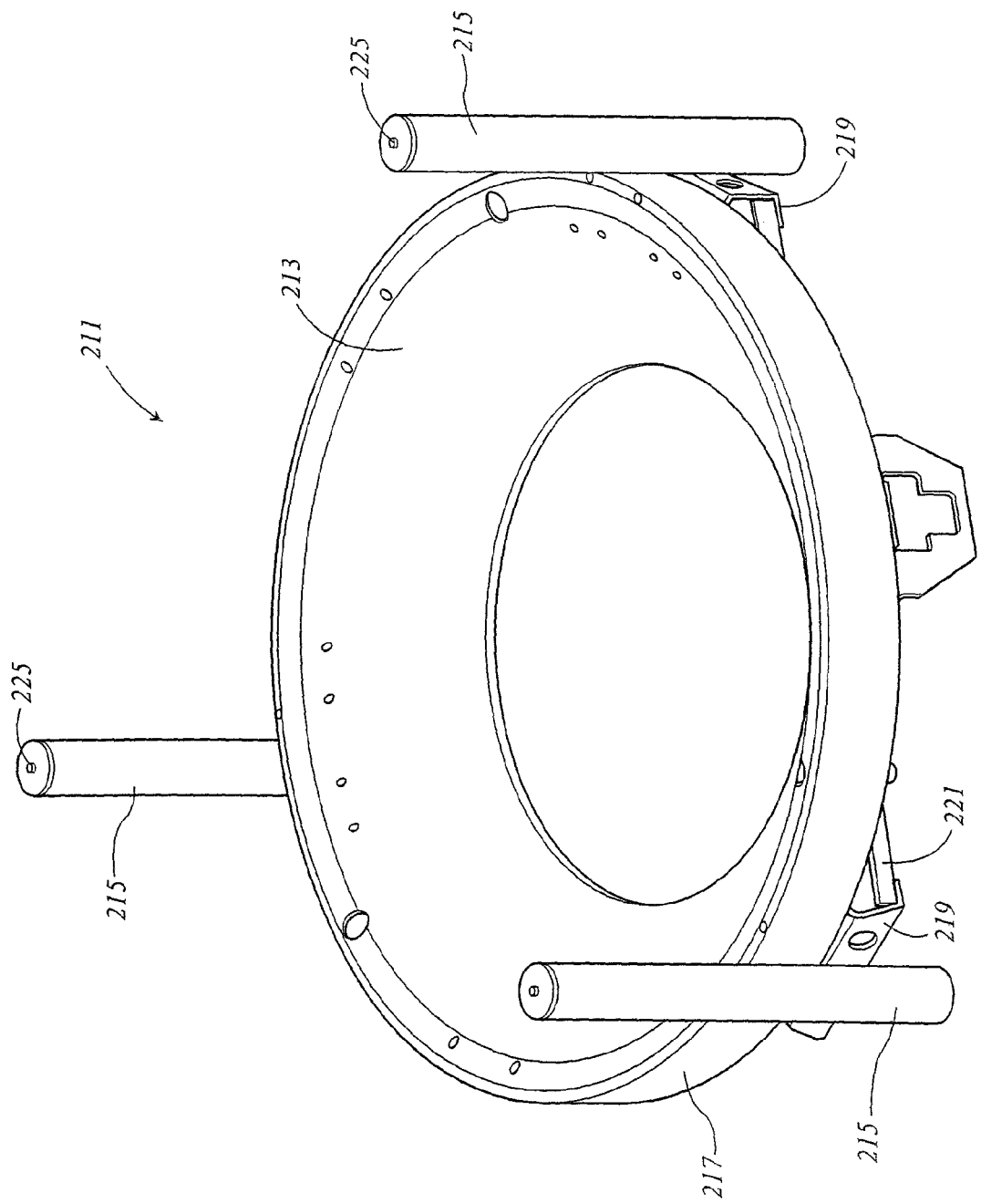
Figure 2H:
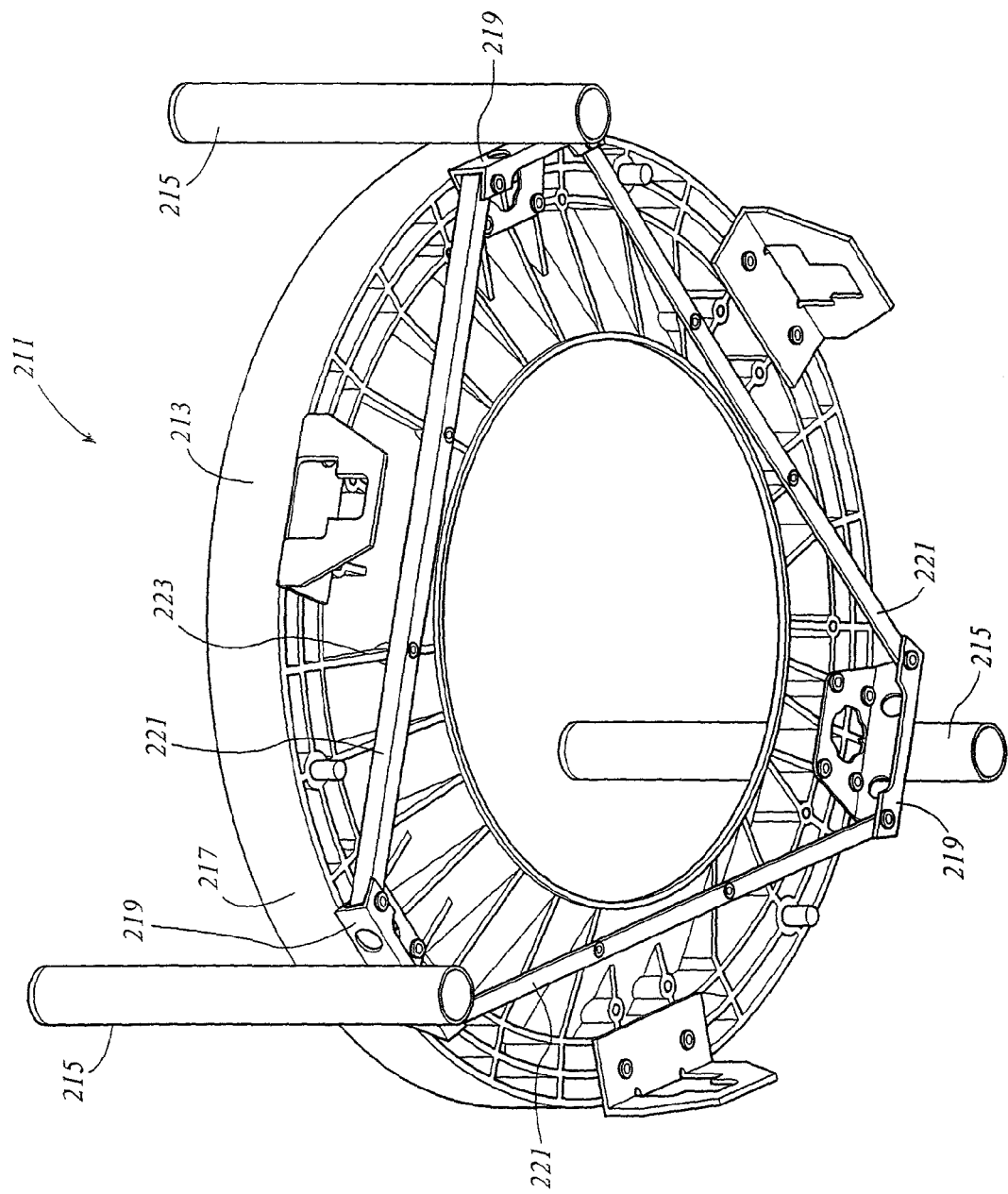
FIG. 2h is an isometric view from below and to one side of the carrier assembly of FIG. 2g.
Figure 2J:
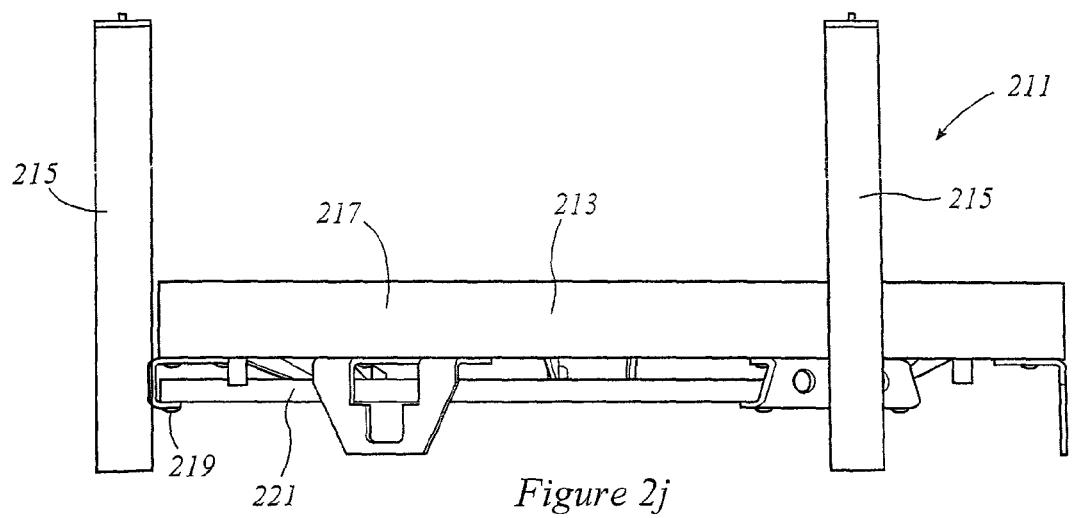
FIG. 2j is a side view of the carrier of FIG. 2g.
Figure 2I:
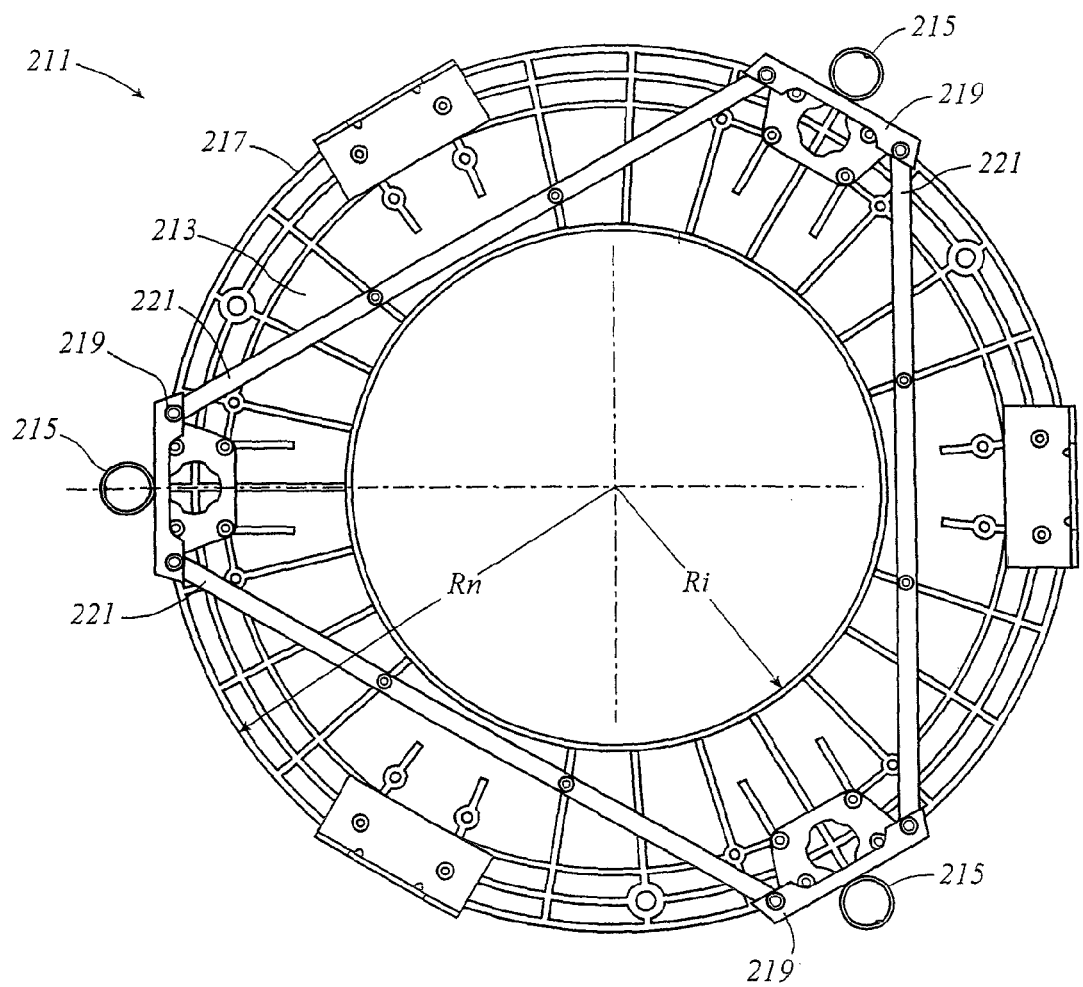
FIG. 2i is a bottom view of the carrier of FIG. 2g.
Figure 3A:
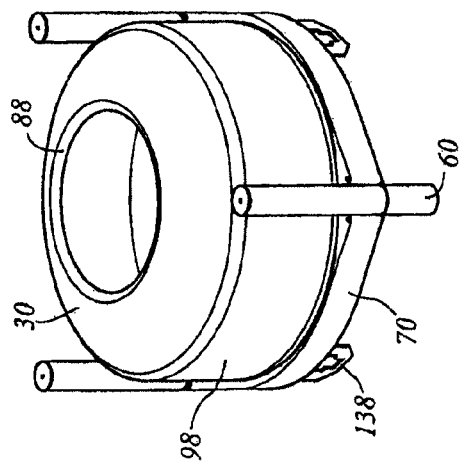
FIG. 3a is an isometric view of the carrier assembly of FIG. 2a with a large workpiece carried thereon.
Figure 3D:
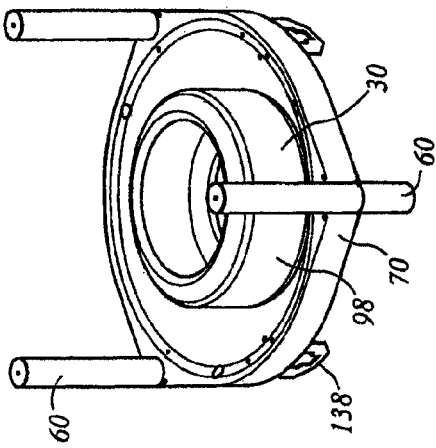
FIG. 3d is an isometric view of the carrier assembly of FIG. 2a with a small workpiece carried thereon.
Figure 3B:
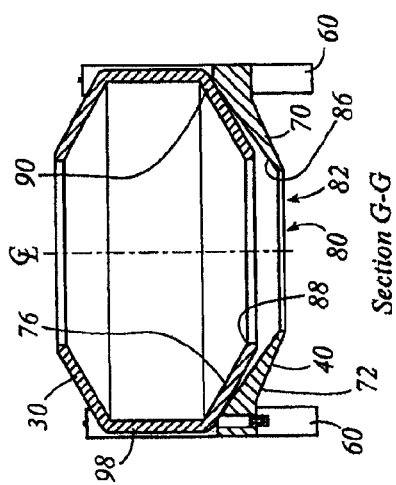
Figure 3E:
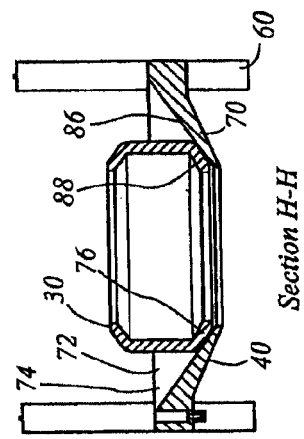
FIG. 3e shows a diametral cross-section of the carrier assembly of FIG. 3d.
Figure 3C:
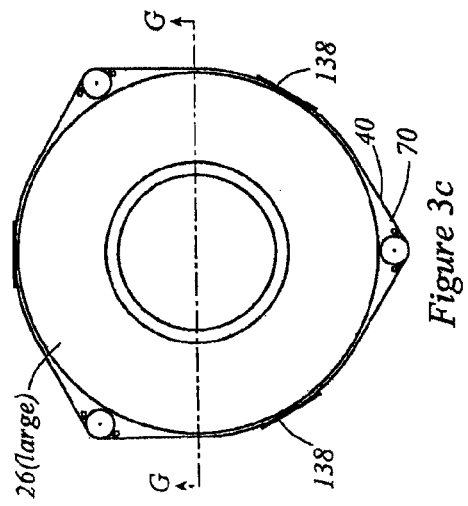
Figure 3F:
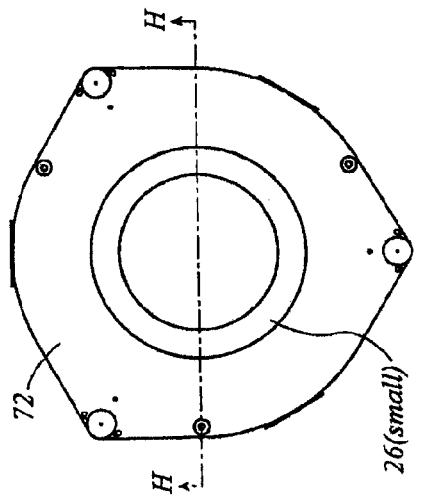
FIG. 3f shows a top view of the assembly of FIG. 3d.

In the alternate embodiment of FIGS. 2g, 2h, 2i and 2j, a carrier 211 is substantially similar to carriers 70, 200 and 210, but differs therefrom inasmuch as body 213 of carrier 211 is substantially circular with an array of supports, namely legs 215 that are mounted outside the outer circular wall 217, rather than being faired into it in the manner shown in FIGS. 2d and 3c, for example. However, if the profile of carrier 211 includes the projected footprint of body 213 and supports 215, once again the profile is non-circular, and the supports stand outside the smaller radius $R_n$, and, when stacked, the supports sit in one of the generally triangular interstitial spaces between the various stacks. It may be that legs 215 are mounted to formed brackets 219, which may be sheet metal (e.g., steel) load spreading reinforcements, that mount to the underside of body 213 as illustrated. Carrier 211 may also include reinforcements in the nature of ties or braces between the supports, or the support brackets, those tie members being identified as items 221. Theses reinforcements may have the shape of formed sections (such as a hollow tube or angle iron, and may tend to function as flange members mounted to the underside of the main moulding 223 of body 213, fastened thereto at intermediate and end locations, and tending to discourage vertical deflection. It may be that ties or supports or reinforcements of this nature may be employed where a stronger structure is required, as for example for larger tires such as bus, truck or tractor tires. In some embodiments, legs 215 may be formed from hollow tube. The upper end of the tube may be capped, and the cap may have a protrusion as at 225. Protrusion 225 may be a pin, a stub, a nipple, a stud or such like. The hollow inner diameter or clearance inside the tube may be several times the diameter, or largest dimension of protrusion 225, such as may permit one tote leg to stack upon another in a slightly offset manner. For example, in one embodiment the diameter of the nipple may be less than % of the hollow diameter of the tube, or of an accommodation in the bottom of the tube, in another, less than one half, in another one third or less. This may permit a stack to be built more or less vertically where the floor of the storage facility is slightly uneven.

In each of these embodiments, the dispersal of supporting and lifting members about the periphery of the device is such as to yield static equilibrium both when supporting from below and when lifting from above. Some embodiments may include three stacking supports. Some embodiments may include three lifting fittings. In some embodiments the stacking supports alternate about the periphery of the carrier with the lifting fittings. In one embodiment, the stacking supports and the lifting fittings may be located at substantially the same circumferential locations, as where, for example, fitting 226 is employed.

As noted above, the processing equipment of facility 20 may include a further transport apparatus 64, which may be used to deliver workpiece 26 from the buffer stock area, i.e., temporary storage facility 32, to a second processing zone, 66. Second processing zone 66 may include processing equipment such as tire presses 230, each of which may have 1 or 2 tire mold cavities in which the finished tires are formed. Transport apparatus 64 may be a conveyor belt system, with suitable handling equipment, such as cranes. It may be used to transfer green tires 30 from the conveyor belt system to one or another of the presses 230 for curing. After curing the finished tires may be transported away, whether by such means as a conveyor or some other. Alternatively, as shown in FIG. 6, workpiece 26 may be removed from carrier 70 at temporary storage facility 32, and placed on a different embodiment of transport apparatus, in the nature of a mobile carrying unit 240. Mobile carrying unit 240 may be a powered unit having an electronic control system by which mobile carrying unit 240 is directed between temporary storage facility 32 and whichever of the processing stations of second processing zone 66 may be its allocated destination. By way of example, facility 20 may include many different sizes of tire presses 230, for making different sizes and types of tires. Clearly, a small green tire would not be directed to a press for a large tire. The control system of facility 20 may include a central processing unit and database by which the locations and properties of each of the green tires may be recorded and tracked, such that carrying unit 240 may be directed to the appropriate press at the right time with the right type of green tire 30, the properties of the various presses, and their locations, also being stored in a database. Mobile carrying unit 240 may have a signal transmitting and receiving apparatus by which it may receive destination directions from the control system, and by which it may send feedback signals pertaining to its speed, direction, orientation and location to permit the control system to monitor its status and progress.

Mobile carrying unit 240 may include a carrying interface, which may be identified as a seat 242 upon which workpiece 26 may be positioned and transported. Seat 242 may be supported by a chassis 244, which may itself be provided with running gear 246. Chassis 244 may be include upstanding walls 254, of which there may be six joined together in a hexagonal cylindrical arrangement. A fender, or bumper, which may be circular, and may have the same outside peripheral outline as seat 242 (or such other superstructure as may be), or may be shy thereof, may be mounted about chassis 244. Bumper 254 may include a resilient member, such as a rubber strip. The running gear may include at least one driven wheel; a motor for driving that wheel; a sufficient number of other wheels to permit mobile carrying unit 240 to stand in a stable upright condition both when empty and when carrying a workpiece; a steering mechanism, which may operate on one or more of the previously mentioned wheels; and an electronic control unit such as may be operable to receive signals from the control system of facility 20, to transmit status information back to the control system; and to operate the motor and steering mechanism. In one embodiment, mobile carrying unit 240 may have two driven wheels 248, 250 each driven by its own motor, and each being independently operable. Wheels 248, 250 although not necessarily sharing a common shaft, may be aligned on a common axis of rotation. That common axis may be a diametral axis of carrier 240 more generally, where the center of rotation is the vertical axis of seat 242, and, by extension, of workpiece 26 when placed centrally on seat 242. Mobile carrying unit 240 may also include a number of casters 252 to maintain balance of unit 240 about the axis of wheels 248, 250. In one embodiment, the steering mechanism is provided integrally in the motor control since advancing one motor more quickly than the other will cause the unit to turn, the casters being slave idlers that follow the motion dictated by the driven wheels. In the event that the motors are driven in opposite directions at equal speed, unit 240 may rotate in place about a vertical axis (assuming the rolling surface to be a substantially horizontal plane). In another embodiment, the common axis of wheels 248, 250 may be offset from the diametral axis, and a single caster may be provided to give a three-point, or tricycle, undercarriage support arrangement. Mobile carrier unit 240 may communicate with control system 44 electronically, whether by laser, infrared, or electrical signals, such as radio signals, which may be Ethernet telephony signals. This communication may allow unit 240 to receive instructions concerning which load to pick up, where, and when, the route to take to a destination, the orientation of the workpiece it is carrying, and soon. It may also allow unit 240 to send status information concerning its own function and location, and concerning obstacles it may encounter.

Figure 6A:
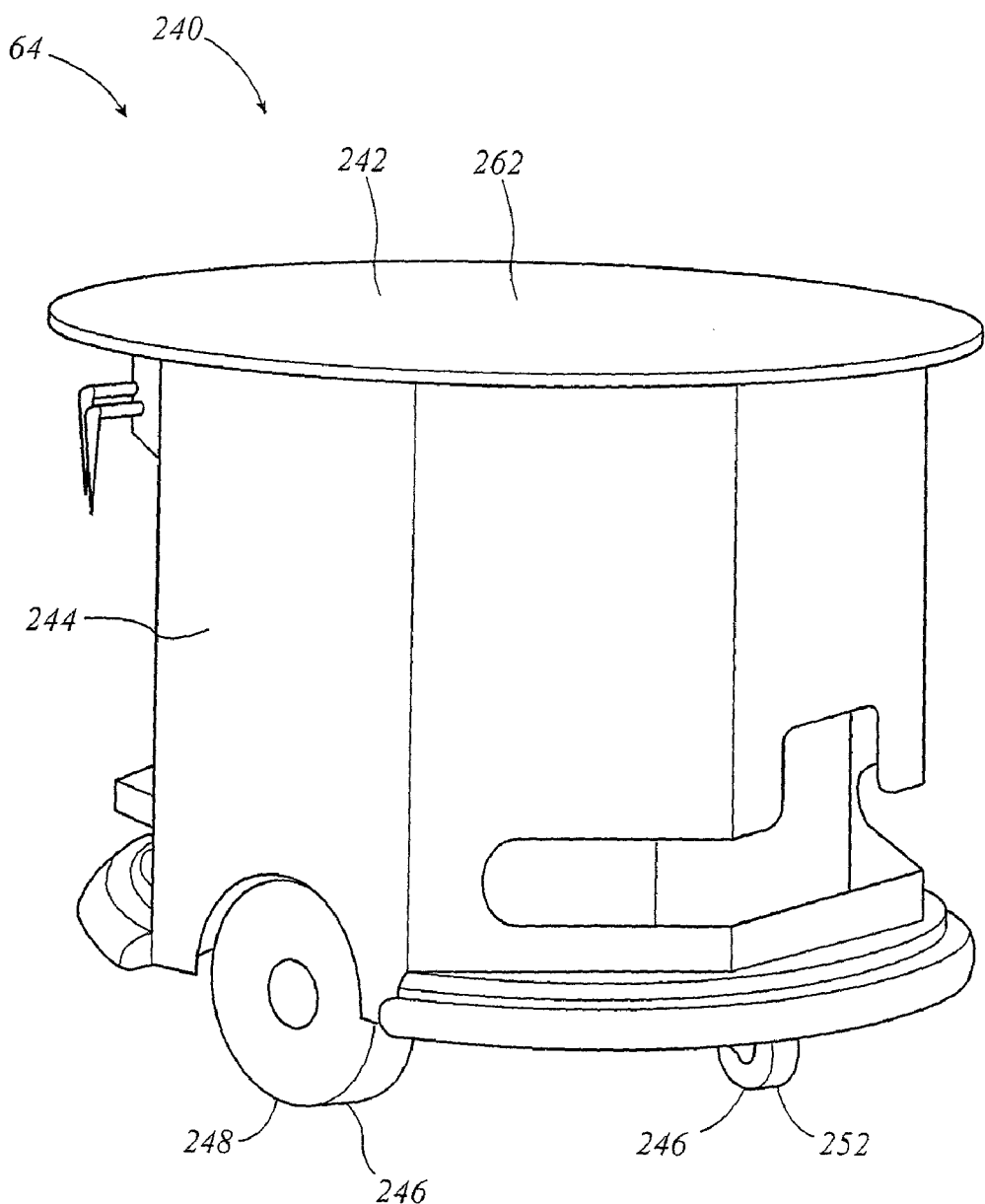
Figure 6E:
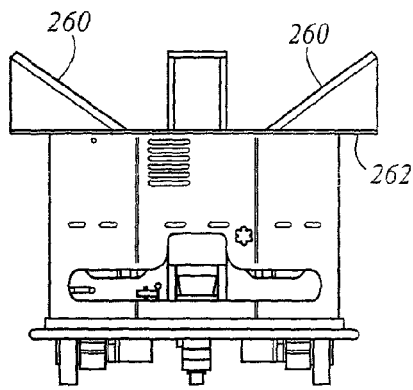
Figure 6F:
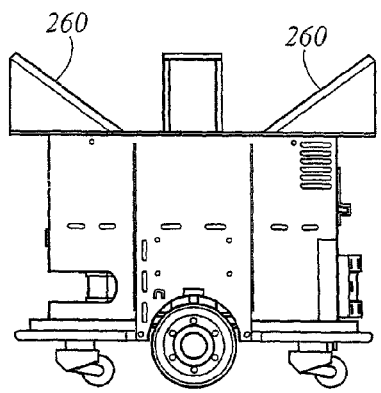
FIG. 6f is a side view of the mobile carrier unit of FIG. 6e.
Figure 6G:
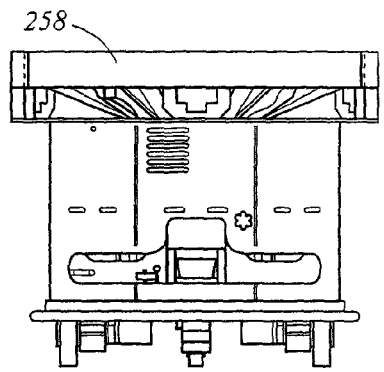
Figure 6H:
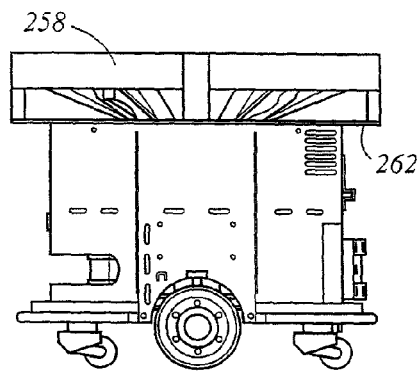
FIG. 6h is a side view of the mobile carrier unit of FIG. 6g.
Figure 6I:
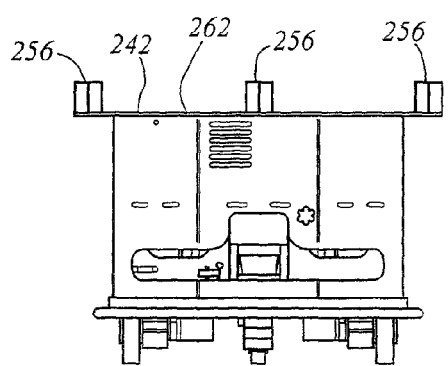
Figure 6J:
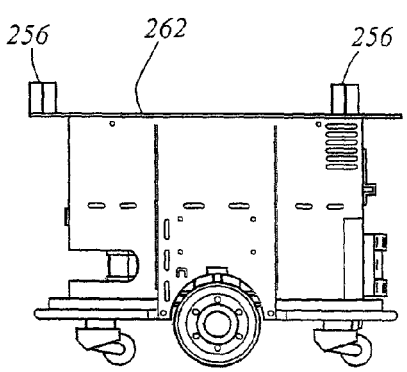
FIG. 6j is a side view of the mobile carrier unit of FIG. 6i.
Figure 7D:
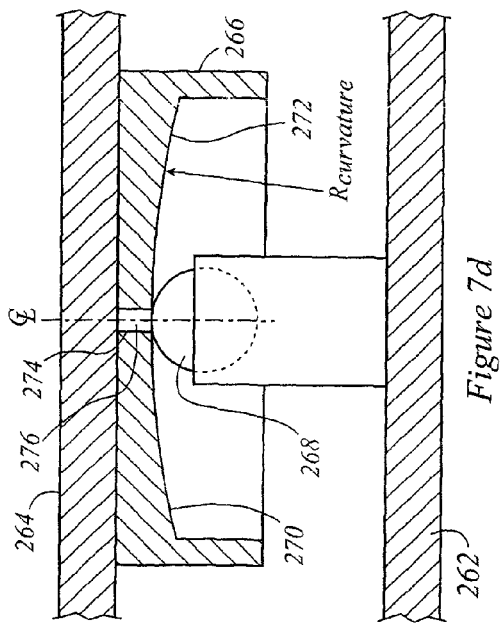
Figure 7C:
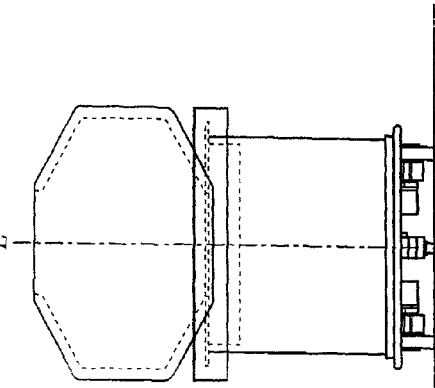
Figure 7A:
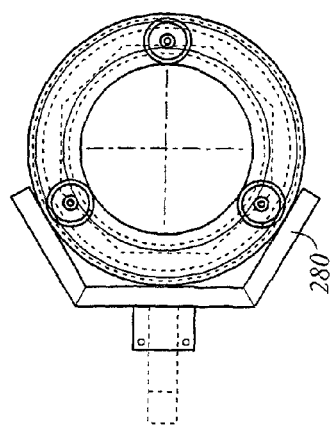
Figure 7B:
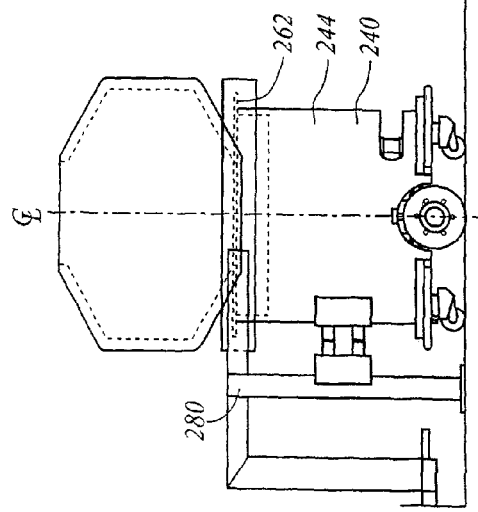
Figure 8A:
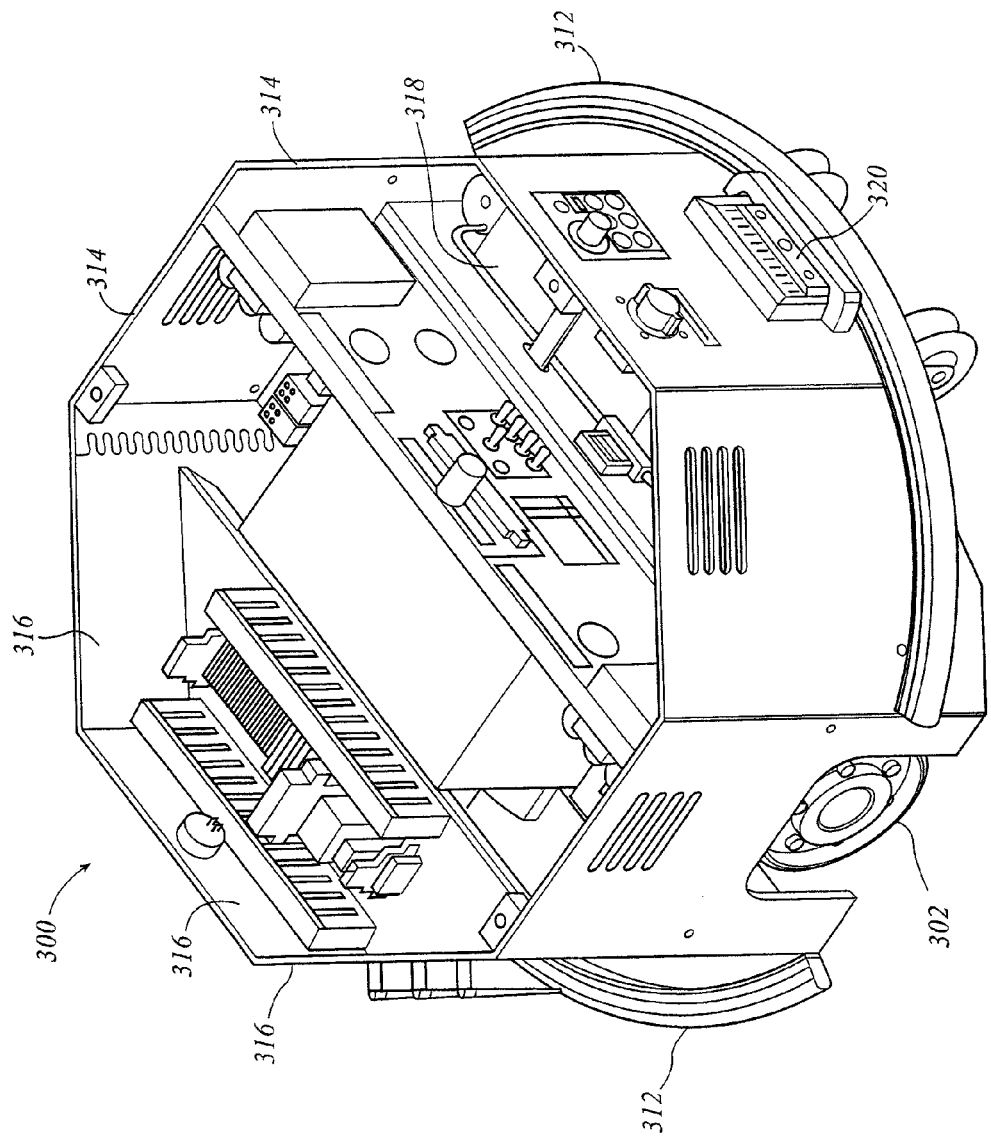
FIG. 8a shows an isometric view from above, rearward and to one side of an alternate mobile carrier unit to that of FIG. 6a, with the upper deck structure removed.
Figure 8B:
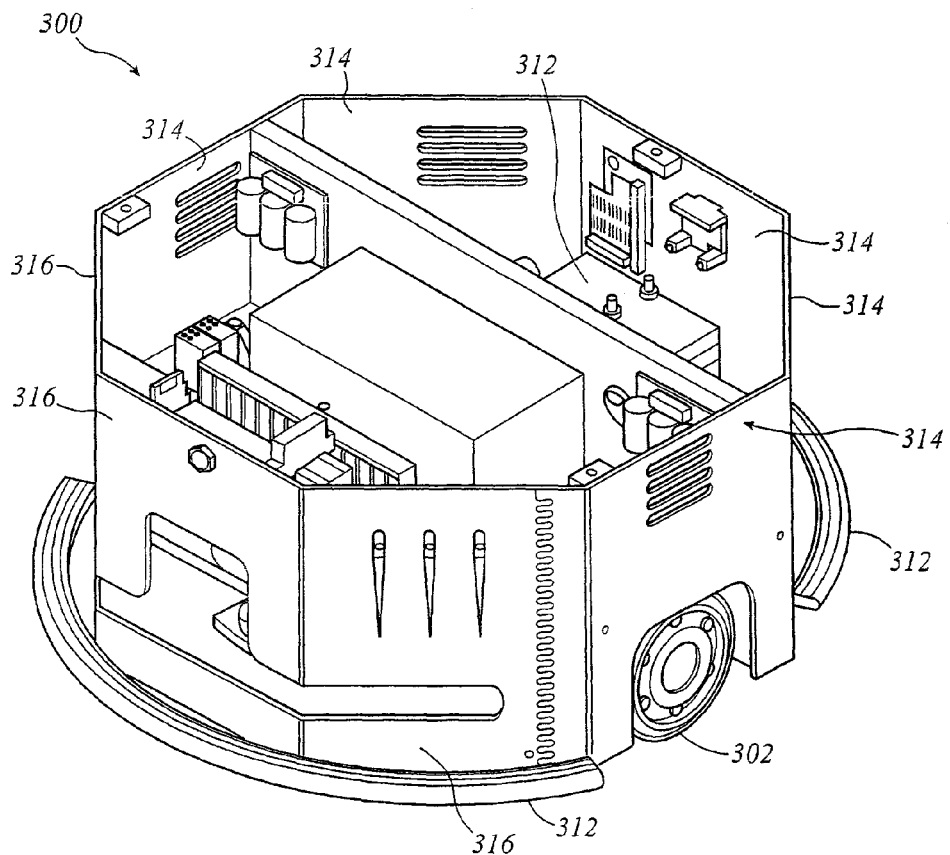
FIG. 8b shows an isometric view of the mobile carrier unit of FIG. 8a from above, frontward and to one side.
Figure 8C:
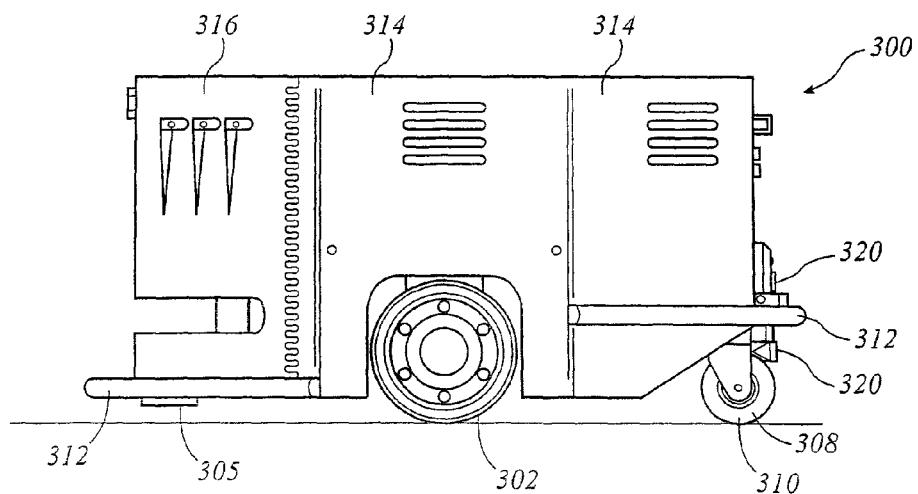
Figure 8D:
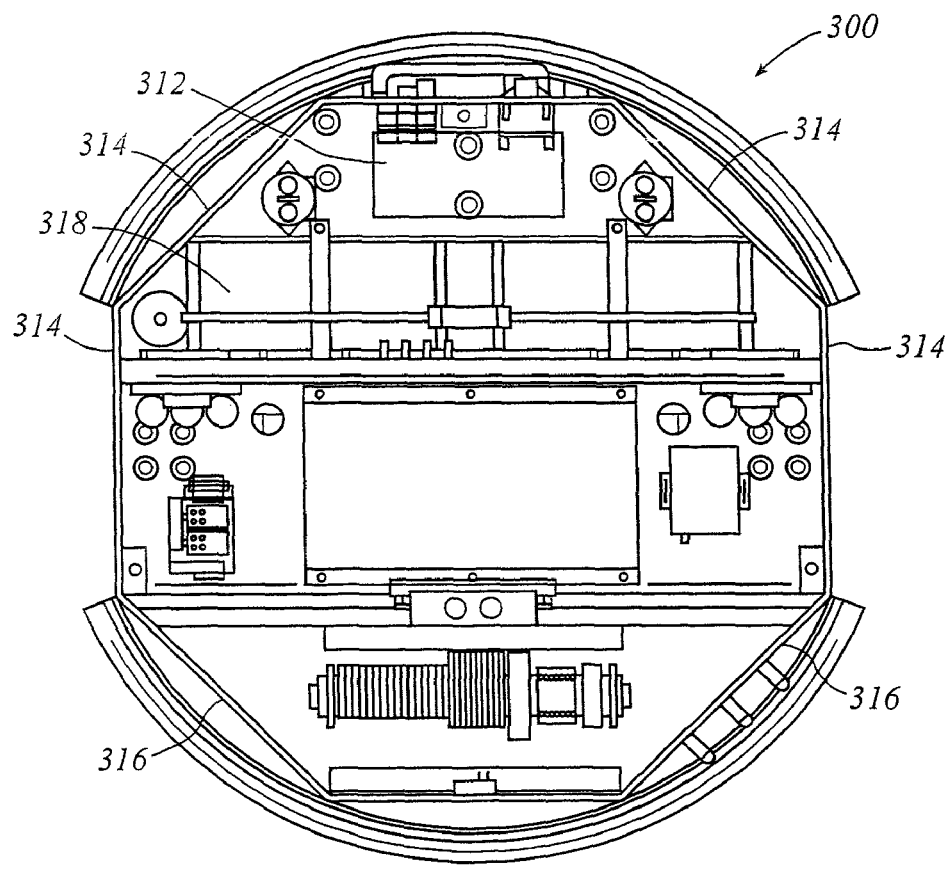
Figure 8E:
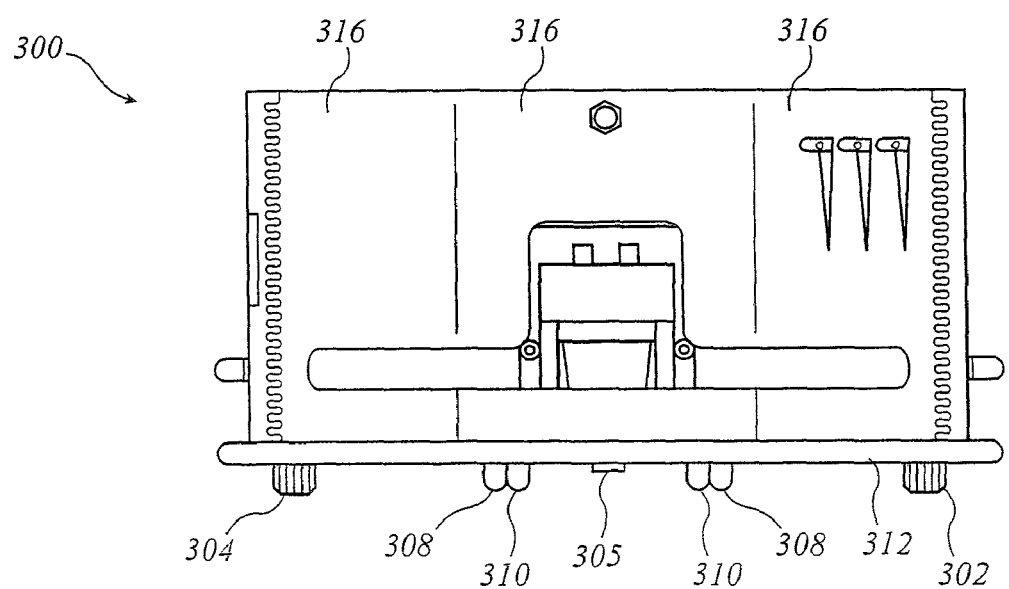

It may be that seat 242 provides an array of members 256 having the same geometry as the upper ends or upper portions 120 of supports 60, as shown in FIGS. 6*i* and 6*j*, such that a workpiece 26 on a carrier 70 may be placed directly on top thereof. Alternatively, as shown in FIGS. 6*g* and 6*h*, seat 242 may have a body 258 having substantially the same form as first member 72, and workpieces 26 may be accommodated therein in the same manner. In the further alternative embodiment of FIGS. 6*i* and 6*j*, seat 242 may be defined by an array of sloped wedges 260, which may include four plates on 90 degree centers, those plates co-operating to define an interface that approximates the lading bearing surface of carrier 70.

Mobile carrying unit 240 may include a flat plate 262 that overlies chassis 244. Flat plate 262 may itself define an alternate embodiment of seat, or may sever as a base upon which to mount fixtures such as those shown in FIGS. 6*e*, 6*f*, 6*g*, 6*h*, 6*i* and 6*j*. Plate 254 may be a substantially flat plate, may lie in a substantially horizontal plane, and, when acting as a seat without the addition of additional fixtures, may have a roughened or textured work piece interface surface as discussed above in the context of carrier 70. Plate 262 may have a size corresponding to the largest workpiece 26 to be processed in facility 20. In the case of a tire manufacturing facility, plate 262 may be substantially circular.

Chassis 244 may have a lateral extent and a longitudinal extent. It may be that either the lateral extent, or the longitudinal extent, or both, of chassis 244 do not exceed the corresponding lateral or longitudinal extent of plate 262, or of carrier 70, 200 or 210 mounted on members 256, or of body 258 or wedges 260, as may be. That is, chassis 244 may fall entirely within the vertical projection of plate 262, body 258 or the workpiece envelope of wedges 260, as may be. Expressed differently, it may be that chassis 244 is free of any portion extending proud, and in particular, radially proud of plate 262. Expressed differently again, plate 262 may extend radially proud of all portions of chassis 244, and chassis 244 may at all locations lie shy of the outer peripheral margin of plate 262. Plate 262 may have a center point, or a center of rotation. That center point may lie above the center of rotation of the steering mechanism, or, alternately expressed, in the one embodiment, directly above the mid point of the axis shared by the two independently driven co-axial wheels. It may also be that the size of plate 262 corresponds generally to the size of carrier 70. In one embodiment the circular supporting region of plate 262 may be within 20% of the size, in terms of diameter, of the circular green tire supporting portion of carrier 70. In another embodiment they may be within 10% of the same size. In still another embodiment, they may be of substantially the same size. That is, plate 262 may be substantially circular, and may have a similar, or substantially the same, radius as the conical portion of carrier 70, that radius being substantially the same as that of the largest green tire 30 to be carried upon plate 262.

Chassis 244 may have a polygonal shape, be it as a hexagonal cylinder, or other suitable form. While it may be that mobile carrying unit 240 may deliver green tires 30 to their designated tire presses in green tire totes, for removal at the press, in contrast it may be that unit 240 may avoid the need to transport totes away from the temporary storage region 32 to the presses at all, but may merely carry the green tires. To the extent that units 240 are remotely controlled, and their positions are continually known, the units can be caused to operate without having their green tire loads come into contact with each other. Further, to the extent that the unloading position adjacent any of the presses must be larger than plate 262, and to the extent that unit 240 has drive gear permitting it to rotate about the central axis of the workpiece, unit 240 can be driven to "spot" the workpiece in a specific orientation relative to the press such that the workpiece may be placed within a few degrees (+/−15, or +/−5 deg.) of its optimal orientation in the press, and within a small tolerance distance (e.g., less than 2", or less than 1", as may be).

Mobile carrying unit 240 may have a seat 242 that is movable relative to chassis 244. That is, chassis 244 may be surmounted by plate 262, as before. Plate 262 may carry above it a seat 264 having a suitable geometric interface for carrying the workpiece. Seat 264 may have the general layout of any of the seats noted above, be it 256, 258, 260 or another plate such as plate 262. Trapped between plate 262 and overlying seat 264 may be an array of displacement compliant fittings 266 operable to permit seat 264 to move relative to plate 262. Compliant fittings 266 may permit two degrees of freedom of motion, those being predominantly linear motion in the longitudinal or transverse directions relative to chassis 244 (the longitudinal direction being defined as lying in a horizontal plane and being perpendicular to the axis of rotation of the main, driven wheels 248, 250 and the transverse, or lateral axis lying in the same plane and being parallel to the axis of rotation), or some combination of displacement in the longitudinal and lateral directions.

To that end, there may be three displacement fittings 266, which may be arranged on 120 degree centers about the vertical centerline axis of seat 242 when it is in its at rest position. Each fitting 266 may include a male fitting in the nature of a vertically protruding roller bearing 268, and a matingly co-operable female fitting in the nature of a concave member 270 having a bearing surface 272 against which roller bearing 268 may act in rolling contact. Fitting 266 may also have a travel limiting member, which may be a circumferentially extending peripheral wall 265, such as may arrest displacement when it meets the pedestal of roller bearing 268. The roller bearing pedestals may be mounted substantially directly above the upstanding walls of chassis 244. It is arbitrary whether the bearing surmounts the concave member, or the concave member surmounts the bearing, and it is not necessary that all fittings 266 be the same side up. Bearing surface 272 may be a portion of a spherical surface. The radius of curvature of bearing surface 272 may be quite gentle. When engaged, gravity may tend to urge bearing 268 to a central position with respect to concave surface 272. In some embodiments fitting 266 may include a threshold dislocation fitting 274. Fitting 274 may have the form of a depression, or pit, or bore, 276 having a lip diameter substantially less than the diameter of roller bearing 268, such that a small cusp of roller bearing 268 may sit therein. A small lateral perturbation, or jiggling, may tend not to dislodge roller bearing 268 from fitting 274, as during normal travel between temporary storage facility 32 and some other location in facility 20, whereas a larger perturbation beyond that threshold value will cause relative displacement between roller bearing 268 and concave member 270, such as when mobile unit 240 docks with a docking station 280 adjacent to one of presses 230. Docking station 280 may have a specific position relative to press 230, and the docking step may urge workpiece 26 to a position within a particular tolerance for automatic loading into a press 230. Once the cause of the displacement perturbation is removed, roller bearing 268 and concave surface 272 may tend to want to return to their neutral, central at rest position. When roller bearing 268 encounters fitting 274, it may tend to move into engagement, and discourage further movement, rather than oscillating. In that sense, fitting 274 may be thought of a motion calming device, or as a hysteresis device.

In the alternate embodiment of FIGS. 8a to 8e, there is a mobile carrying unit 300 that is substantially the same as mobile carrying unit 240. In FIGS. 8a to 8e, carrying unit 300 is shown without un upper deck, or lading support array, however it may be termed. Any of the upper deck or lading support structures discussed above with respect to unit 240 may also be used for or with unit 320. It may differ in a number of respects. First, the undercarriage of unit 300 may include a pair of wheels 302, 304 whose axis of rotation coincides with a diametral axis of the carrier or carrier mounting plate upon which the lading may sit, e.g., item 242, 258, 260 306, such that when wheels 302 and 304 are independently driven in opposite directions, unit 300 may tend to spin or rotate about a vertical centerline axis that is common both to the carrier, and to the work piece. The undercarriage may also have at least one more support element 308 to provide at least three point static determinacy. Support element 308 may be one or more casters 310. The caster or casters 310 may be an idler, or slave, as opposed to being driven. Carrier 300 may have a generally hexagonal shape, with a generally circular bumper, the center of the hexagon and the center of the bumper 312 being concentric with the centerline of the unit. Although the projected footprint of the body, and bumper of the unit may be centered on the mid-point of the shared axis of rotation of wheels 302, 304, the center of gravity CG is eccentric, and falls within the undercarriage footprint, where the undercarriage footprint is defined as a polygon constructed by stretching a cord about the points of contact of the wheels with the flat surface upon which they may ride. To that end, unit 300 may be ballasted toward the side of casters 310, either by adding ballast weighs 312, by placement of heavier items such as the or by making the sidewall panels 314 thicker on the caster side of driven wheels 302, 304, and therefore heavier, than sidewall panels 316 to the other side of the axis of the driven wheels, or some combination thereof. In the event that unit 300 nonetheless tips to the wrong side and bottoms on the wrong end, there is a tail bumper, or skid 305 on the underside normally non-contacting end.

Units such as unit 240 and unit 300 tend to be electrically powered units that rely on rechargeable batteries 318. Inasmuch as the charge runs down, and inasmuch as there may be several (or several dozen, or several hundred) of these units in a large manufacturing facility, at any given time a significant portion of those units may be idle at a recharging station. This is not necessarily a particularly efficient manner to use these units. Unit 300 (and unit 240, as may be) may be provided with a charging fitting, or fittings 320, such as may have positive and negative terminals. Furthermore, units 240 and 300 may be provided with optical sensing equipment 322 such as may include laser or infrared sensors 324 permitting the unit to sense obstacles in a forward zone. The peripheral housing 324 (being the generally hexagonal upstanding main wall assembly) of unit 320 may include a laser vision slot or aperture 326 of corresponding size to permit sensors 324 to have a range of vision outside the unit. That zone of vision may cover a range of arc of the order of 180 degrees. Using sensed information, unit 240 (or 320 as may be) may navigate around obstacles in its path, or may determine another path.

Unit 240 or 320 may be termed a self-guided unit, in which information is provided pertaining to a desired destination, and the unit then determines a route to that destination on the basis of stored data concerning plant morphology and updated information concerning the location of other units. The unit may have a database that provides it with co-ordinates and size information relative to the floor plan of the facility, and the position of walls and other equipment. Further, unit 240 or 320 may have interactive communications equipment by which it may be given real time updated information on the location of other units in the storage or manufacturing facility, in addition to feedback from its laser sensor with respect to newly observed obstacles. In operation, unit 240 or 320 may be given a destination in the plant at which to receive or deliver a product. For example, in a tire manufacturing plant, unit 320 may be directed to the storage facility to pick up an empty carrier 70, 200, 210, or 211, as may be from the empty storage facility. Unit 240 (or 320) is given an address of a lay up machine at which carrier 70 is to be loaded. Unit 240 (or 320) then determines it own route according to the data provide and stored in memory, and the most recently received information on the location of other units and obstacles in the plant. Once having arrived at the lay up unit, it docks, and receives an appropriate green tire. Unit 240 then determines the best route to the green tire storage facility. Upon arrival it docks again, and the carrier 70 is removed. Unit 240 then receives updated information on its next task (which may be to return to the empty carrier supply depot). Each time unit 240 or 320 docks, it may be provided with electric charge. Thus, while it needs to sit still for the loading and unloading process, it is also being charged, or, in effect, refueled. Unit 240 or 320 may have Nickel metal hydrate batteries that may accept a relatively high charging current, such that unit 240 or 320 may not need to be dispatched to a charging facility as often, or at all, and so may tend to have a higher percentage of time in active useful activity. This may permit the plant to operate with a smaller number of AGV's. It may be that charging units are provided only at the empty carrier and green tire removal stations, or it may be provided at every station in the plant at which a mobile unit may dock. The frequent recharging may tend to permit fewer or smaller batteries to be used, such that those batteries may form a smaller proportion of the weight of the mobile carrier units than might otherwise be the case. For example, the weight of the batteries may be of the order of less than ⅓ of the empty (i.e., non-laded) weight of the unit. In one embodiment the weight of the batteries may be less than ¼ of the unladed weight of the unit. In one embodiment, the unit may weigh about 230 to 270 lbs (in one embodiment, about 250 lbs), all up, of which the battery weight may be 40-60 lbs (in one embodiment, about 45-50 lbs), giving a ratio in the range of about 15% to about 25%, (in one embodiment, about 18-20%).

The use of unit 240 or 320, in contrast to previous attempts at automated workpiece delivered, does not rely on fixed tracks or grooves mounted to or formed in a factory floor, or on large workpiece delivery vehicles. Rather, the embodiments described use a relatively small workpiece carrying unit, such as item 240 or 320 is able to determine its own route from one station to the next depending on current conditions. "Relatively small" may mean a unit that is of comparable size, in teens of floorspace footprint, to the largest item that the unit may be called upon to transport. That is, the clearance of the bumper may be larger than the outside diameter of the tote, or if no tote is used, of the largest workpiece to be carried. Alternatively, the largest characteristic dimension of the carrying platform may lie in the range of 80 to 120% of the largest workpiece or tote that is to be carried, and may be in the range of 90 to 110%. The characteristic dimension may be the diameter of a circle, where a circular deck is employed, or the largest diagonal dimension of a hexagonal or rectangular deck, as may be. In the context of tires, and more specifically of green tires, in absolute terms this characteristic dimension, be it of the bumper or of the carrying deck, may, in the case of passenger car and SUV tires be of the order of 20 to 40 inches, with one embodiment being in the range of 24-34 inches. In the case of bus and truck tires it may be of the order of roughly 30-50 inches. For tractor and construction equipment tires the sizes may be larger yet again. In one embodiment the overall diameter of the AGV units 240 or 320 may be about 36-40 inches. Further, units 240 and 320 have the ability to move into, for example, a tire press work station, and to "spot" themselves and a green tire in a relatively precise position relative to the press either for pick up or delivery. The unit need not stay at the press during the relatively long cure cycle, but may get on about its business delivering other workpieces. The ability to spot may include not only location with respect to first and second degrees of freedom in linear translation (i.e., a and y directions) but also the ability to spot the workpiece in a known angular orientation with respect to a rotational degree of freedom, namely angular position relative to the z axis such that the end of the belts of the tire in the lay-up may be placed in a known position in the tire press. In the case of units 240 and 320, the main, or driven, tires may be driven independently either in the same direction or opposite directions to provide either translation or angular rotation. Differential speed control of the driven wheels permits turning on non-zero turn radii. It is convenient that the driven wheels are mounted symmetrically to either side of the vertical centerline of the unit and on a diametral axis of the unit, and that this axis is shard by the unit, the carrier, and the driven wheels. It may be noted that the AGV may pick up (or return) the green tires at one orientation (and be electrically charged while doing so), while spotting them at a press in another angular orientation. Units 240 and 320 may sense and avoid problems such as obstructions in the paths, and may service a single press at a time without blocking the path of other units due to their small size and ability to self-manoeuvre.

Figure 9A:
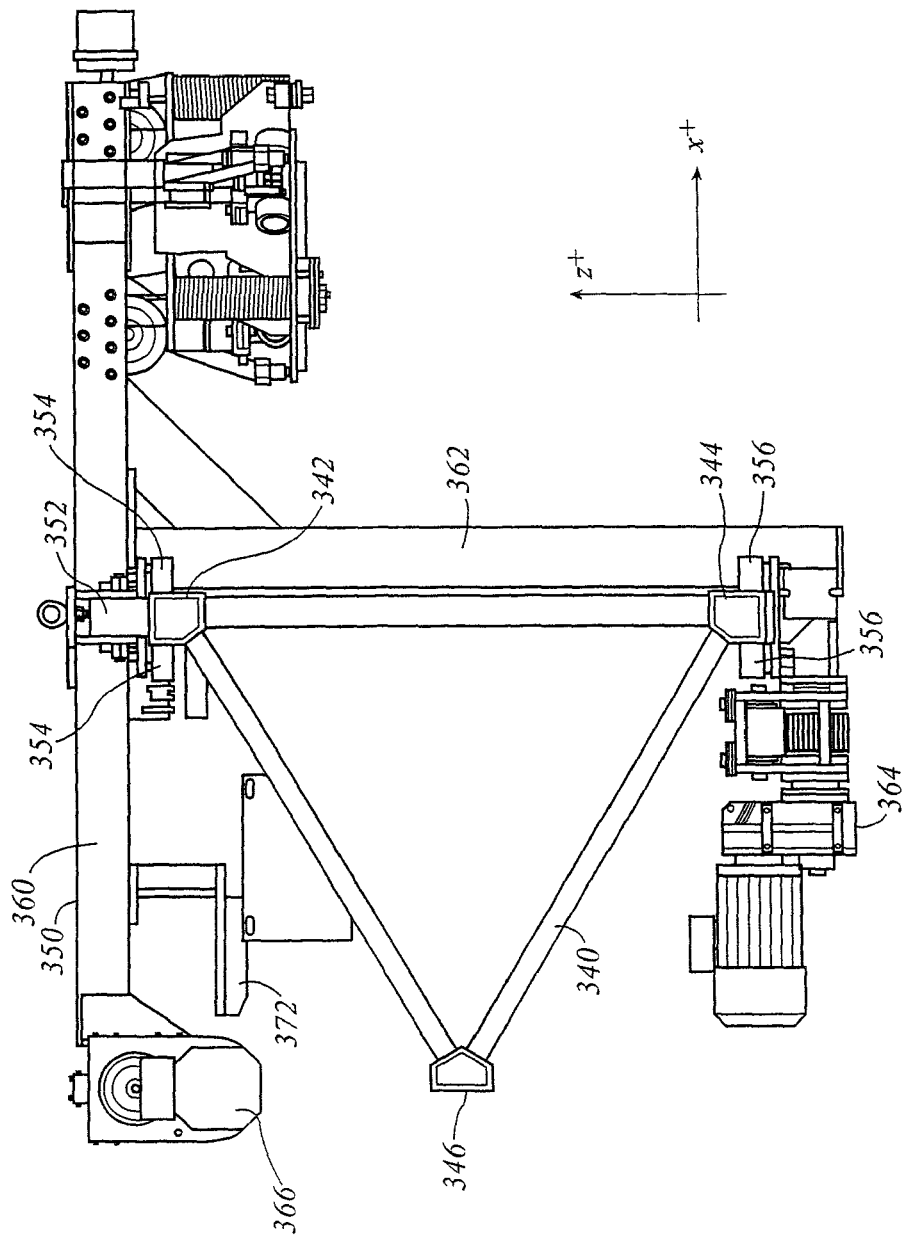
FIG. 9a shows a view through a gantry bridge of the production facility of FIG. 1a, showing a vertical axis retrieval apparatus in a raised position.
Figure 9B:
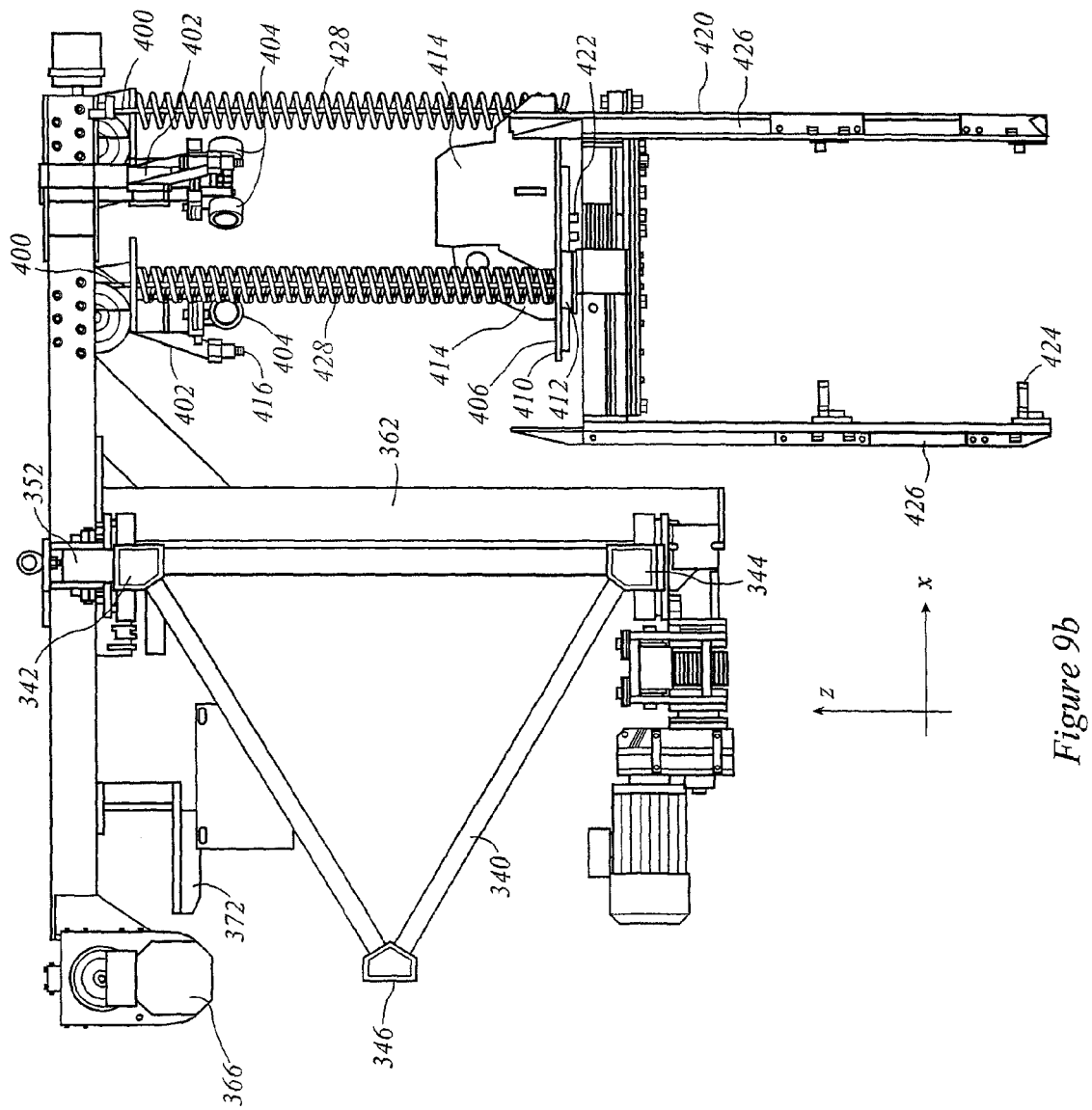
FIG. 9b shows the retrieval apparatus of FIG. 9a in a lowered position.
Figure 9C:
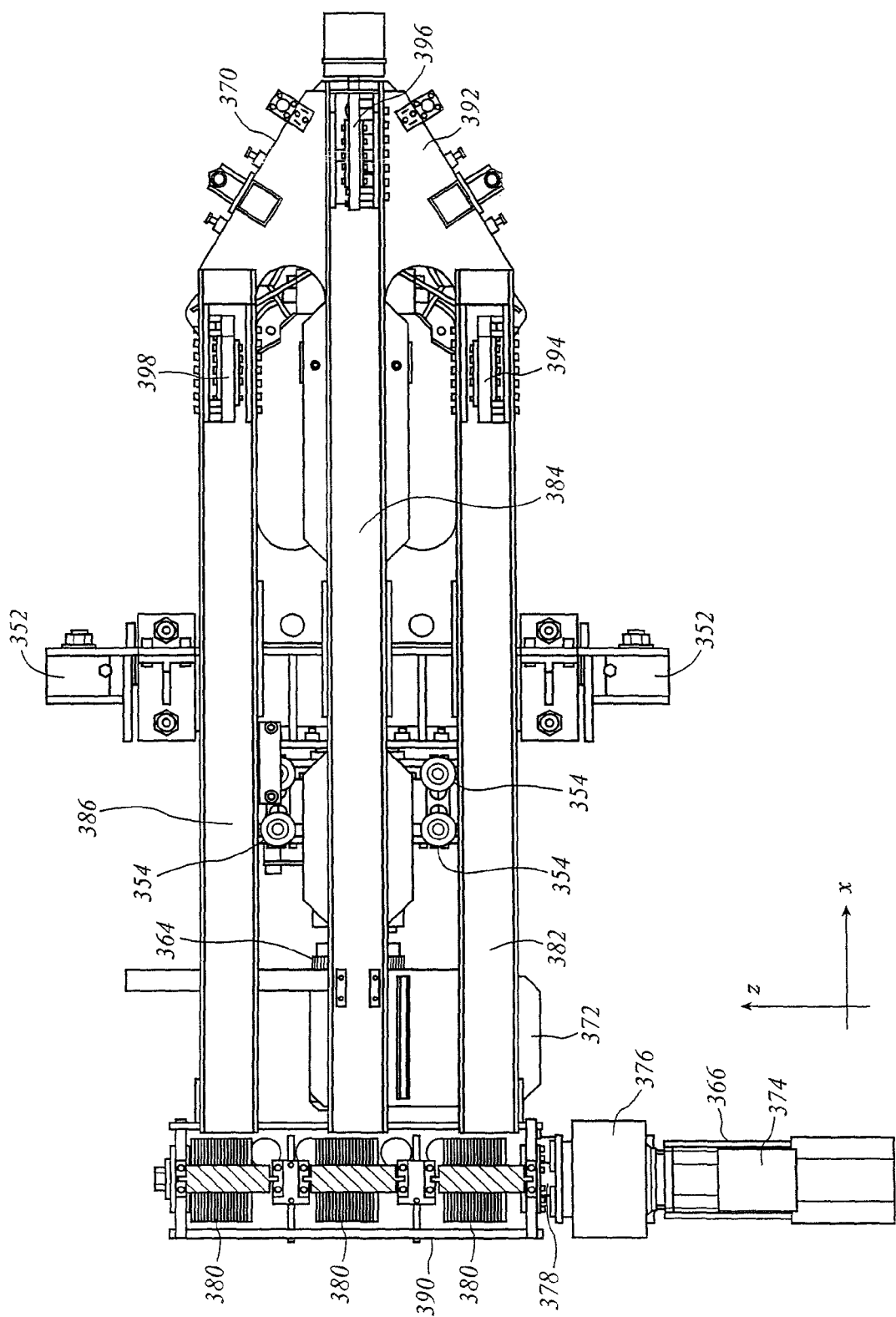
FIG. 9c shows the retrieval apparatus of FIG. 9a from above.

In the operation of the plant of FIG. 1*a*, the workpieces may be transported on mobile carrier units such as items 240 or 320 between the various workstations in the plant, and the storage facilities or the shipping dock, as may be. The workpieces may be contained within temporary transport or storage containers, such as carriers 70, 200, 210 or 211. The workpieces, and the temporary transport or storage containers may be moved between storage locations and the automated guided vehicles, such as items 240 and 320, by conveying equipment. That conveying equipment may include a three-space (x, y, and z) indexing system, as discussed above. Motion in the x-direction may be obtained by moving an overhead gantry crane above the storage and empty container depots. Such cranes may typically run on rails, or girders. Motion in the y-direction may be obtained by traversing the head of the gantry crane between the support girders on the laterally extending bridge, such as a bridge 340. Motion in the z direction may be obtained with a lifting, or vertical travel, or workpiece retrieval apparatus or raising and lowering apparatus, however it may be termed. Such a raising and lowering apparatus is shown in FIGS. 9*a*-9*c*, and is indicated generally as 350.

Bridge 340 may have the form of a truss that is supported at either end on the rails of the gantry, typically by being mounted on rollers or other motion facilitating members. The truss may include an upper compression member, or top chord, 342 and a lower tension member, or bottom chord, 344. While the primary flexural rigidity of bridge 340 may be in the vertical direction, bridge 340 may also include a laterally offset chord member 346 such as may give depth in the x direction. The sides an respective upper and lower faces of top chord 342 and bottom chord 344 (and, indeed, other chord members such as 346 if so employed) may provide both lateral traverse guides, and torsional stabilization with respect to torsion about the y-axis as lading is being lowered, raised or transported.

Apparatus 350 rides on bridge 340, having main support rollers 352 riding on the upper flange of top chord 342, and torsional moment stabilization and lateral guiding provided by four pairs of upper and lower rollers 354, 356. In one embodiment, apparatus 350 may have the appearance of a generally T-shaped structure that includes a generally laterally extending head support structure 360, and a generally vertically extending stem, or hanger, 362. In one embodiment a lateral traverse motor and drive 364 may be mounted to the base of the stem, and may engage a laterally extending drive belt, which may be a chain, or timing belt. Apparatus 350 may also include other location determining members, such as laser sensors such as may permit positioning in the transverse or lateral direction to be determined to an appropriate level of accuracy. It may be desirable for a relatively heavy member, such as drive motor 364 to be mounted at a low level.

At the upper end of the T-shaped structure, the cross-bar of the T may have a drive 366 mounted at one extremity of the cross-member assembly, and a raising and lowering head 370 mounted at the other. A cableway guide bracket 372 is shown adjacent drive 366, which may include a motor 374 and gear box 376. Power may be provided to drive 366 by power cables guided by bracket 372, but not shown in the illustrations. The output shaft 378 may drive an array of paying off reels 380. Each of reels 380 is mounted to pay off (or take up) a linear displacement member such as a cable or web that is guided along a longitudinally extending structural member, such as an angle, tube, or channel, those items being indicated respectively as 382, 384, and 386. While the proximal ends of members 382, 384 and 386 are all mounted to the reel support member, or motor mount, 390, the distal ends of member 382, 384 and 386. may terminate in a generally triangular pattern, and may be joined by a common mounting member, or plate 392, which may be a shear plate. Each of the distal ends of members 382, 382 and 386 may have a sheave or pulley mounted thereto, as indicated at 394, 396 and 398, by which a band or cable member paying out from (or being taken up by) the associated ones of reels 380 may be converted from lateral motion to vertical motion. Plate 392 may have apertures or accommodations formed therein permitting the passage of cables 400 therethrough.

Plate 392 may also have a docking or centering member, or array of members 402 mounted thereto, such as cams, or fenders, or lead-in members, which may in one embodiment be rollers, such as indicated at 404. A lifting head member 406 may be suspended on the various ends of the cables 400. Lifting head member 406 may include a plate 410, that may, in some embodiments, be of a generally triangular, hexagonal, or round shape. Plate 410 may have attachment fittings 412 by which cables 400 are anchored, and mating centering fittings 414, be they cams, or tracks, or rollers, such as may engage items 404. In one embodiment items 404 may be three inclined plates mounted on 120 degree centers about the center of lift of plate 410, that center of lift being, typically, also the centroid of the triangle whose vertices are defined by cables 400 (which may be an equilateral triangle). The apparatus may include limit switches or optical sensors 416 by which the controlling microprocessor may determine that head member 406 is in an up and docked position, or in some other position. Inasmuch as there may be one such sensor at each mating engagement point, a combination of positive and negative signals may permit an inference that plate 406 is unbalanced, or not properly in place, and further transport may be inhibited until verification and correction (as may be required) may occur. To the extent that cables 400 are reeling and unreeling at the same pace from drums of the same diameter, member 406 may tend to be maintained in a level condition. To the extent that there is an array of cable 400 of a number at least as great as three, and those cables are on a common pitch circle relative to the centroid, Those cables define a torsional pendulum tending to urge member 406 to maintain a substantially constant angular orientation about the vertical axis relative to plate 392 (and hence to the paying off tangents of sheaves 394, 396, 398).

An active retrieval head 420 may be mounted to member 406 as at mounting fittings 422 (which may be arranged in a statically determinate array, whether triangular, square, hexagonal, or some other formation). Retrieval head 420 may depend from member 406, and may include movable fingers, or dogs, or lugs, or tote engagements fittings 424, however they may be termed, such as my be employed to engage the lifting fittings of the carriers, be they 70, 200, 210, or 211. Those lifting fittings may be mounted on vertically extending members, such as arms 426 that may be introduced into the interstitial spaces between the carriers stored in the hexagonal packing formations. Inasmuch as power may be required to operate fittings 424, power cables 428 (which may be electric, pneumatic, or hydraulic, for example), may extend in flexible coils. These coils may be mounted to extend between plate 392 and member 406, and may be mounted co-axially about cables 400.

Apparatus 350 may be considered in contrast to retrieval apparatus that employs telescoping vertical retrieval members. Where a telescoping member is used, the manufacturing facility in which it is employed must have ample overhead clearance. It may be that to obtain that clearance, the height of the stacks of workpieces must be restricted to a lower level than might otherwise be possible or desirable. Where height is restricted, a larger floor area is required to achieve the same storage volume. By converting motion from vertical to horizontal, and eventually to rotational (i.e., the vertical height clearance space or reservoir is, in effect, the arc length of cable wound on a reel or drum), the lifting apparatus need not have any major portion extending substantially above the plane of the upper cross member (minor items such as bolt heads, lifting lugs, and so on being smaller than customary clearance). Further, bridge 340 may be nested within the elements of apparatus 350, or, conversely, those elements may be nested about bridge 340, such that of the major structural components of apparatus 350, only the cross-members lie above top chord 342. Expressed differently, the center of gravity of apparatus 350 lies at or below the height of the plane of engagement of rollers 352 on the upper flange of top chord 342. Expressed differently again, the vertical clearance required above bridge 340 may be less than one foot (30 cm), or, alternatively, the height by which apparatus 350 stands vertically proud of bridge 340 is not lonely less than the vertical depth of bridge 340, but less than one half of that depth, and, in one embodiment less than ¼ of that depth. Similarly, then, the ratio vertical height from the plane of the rollers upon which apparatus 350 runs to its uppermost vertical extremity is not only less than the vertical height from the lowermost vertical extremity to the plane of the rolling contact on the upper face of top chord 342, but also less than one half of that distance, and less than one quarter of that distance. In another feature, the vertical clearance of the lifting or retrieving apparatus is substantially the same as the bottom of the stem of apparatus 350. That is, the retrieving head, when plate 406 is in the in the fully upward and docked position, is nested beneath the lateral cross members and the side of bridge 340, such that apparatus 350, with retrieving head 420 mounted thereto, does not extend substantially lower than bridge 340, i.e., it is roughly comparable, with apparatus 350 (including attachment head 420) either terminating above the level of bottom chord 344 or extending downward of it a modest distance that is, for example, less than half or either the overall depth of bridge 340 or of apparatus 350, and which, in one embodiment, is less than ¼ of that distance.

While a lifting apparatus having three support cables, and a generally triangular layout is shown, a larger number of cables could be used, be it four cables with a generally rectangular or square layout, or a five, six, eight or more cables, as may be. In operation, the gantry crane may be driven in the longitudinal and transverse (i.e., x and y) directions simultaneously to position apparatus 350 over the appropriate stack. Once positioned, head 420 may be lowered, an item deposited or picked up, head 420 may be returned to the upward and docked position, and the crane may move to its next destination, be it to move an empty tote from the stack of empties to an automated guided vehicle, so that the AGV can be sent to pick up a green workpiece; or to take a workpiece and place it in storage, or to take a workpiece from storage for delivery to another step, such as curing, or to return an empty tote to the depot of empty totes.

Thus, according to one embodiment, there is provided a manufacturing facility which includes a storage facility and a production facility. Workpieces are located in the storage facility in temporary storage accommodations, and are moved between the storage facility and stations in the production facility by mobile carrier units. The temporary storage accommodations may be units having a generally circular lading envelope, and an hexagonal optimal packing density. The optimal packing density is such that supports for the accommodation units lies outside the lading envelope circle, but within the corner regions of the hexagons of the packing density pattern. The accommodation units have lifting fittings that are accessible from the corners of the hexagons, whether the same as those of the supports, or different ones. The mobile carrier units may be automated guided vehicles. The guided vehicle may be electronically controlled to pick up and deliver workpieces from one location to another, and may include self-navigating software, and interactive communication with other guided vehicles to permit suitable routes to be chosen, or to permit obstacles to be avoided. The facility may include a vertical degree of freedom, or workpiece retrieval apparatus used for transferring workpieces between the storage accommodations and the automated guided vehicles, or to other locations. The workpiece retrieval apparatus may be mounted on a bridge, and may include a multi-element raising and lowering array that is biased to oppose torsional deflection of the lifting member.

Various embodiments of the invention have now been described in detail. Since changes in, or additions to, the above-described embodiments may be made without departing from the nature, spirit or scope of the invention, the invention is not to be limited to those details but only by the appended claims.

What is claimed is:

1. A transporting unit operable to carry a green tire within a tire manufacturing facility, said transporting unit comprising:
 a lading seat supported on a chassis;
 running gear mounted to said chassis;
 said running gear being operable to cause said unit to move from place to place;
 a control system operable to receive destination signals and to operate said running gear;

said lading seat including a lading interface upon which said green tire may be carried; and, said lading interface having at least one degree of freedom of motion relative to said chassis;

wherein said unit includes a self-centering motion allowance member mounted in a load path between said chassis and said lading interface.

2. The transporting unit of claim 1 wherein said lading interface has two degrees of freedom of motion relative to said chassis.

3. The transporting unit of claim 2 wherein said two degrees of freedom permit longitudinal and lateral translation of said interface relative to said chassis.

4. The transporting unit of claim 1 wherein said self-centering allowance member includes a motion deterrent member, said motion deterrent member including a detent pit formed in one of said surfaces and engageable with the other of said surfaces to deter motion therebetween below a threshold level of dislodging force.

* * * * *